(12) United States Patent
Tatsuno

(10) Patent No.: US 7,538,916 B2
(45) Date of Patent: May 26, 2009

(54) DOCUMENT LIGHTING DEVICE, IMAGE READER, COLOR DOCUMENT READER, AND IMAGE FORMING DEVICE

(75) Inventor: Hibiki Tatsuno, Kanagawa (JP)

(73) Assignee: Ricoh Company, Ltd., Tokyo (JP)

( * ) Notice: Subject to any disclaimer, the term of this patent is extended or adjusted under 35 U.S.C. 154(b) by 751 days.

(21) Appl. No.: 11/065,074

(22) Filed: Feb. 25, 2005

(65) Prior Publication Data

US 2005/0195452 A1    Sep. 8, 2005

(30) Foreign Application Priority Data

| Feb. 26, 2004 | (JP) | ............... 2004-052253 |
| Apr. 21, 2004 | (JP) | ............... 2004-125294 |
| Jun. 21, 2004 | (JP) | ............... 2004-182859 |

(51) Int. Cl.
  *H04N 1/46* (2006.01)
(52) U.S. Cl. .................. 358/509; 358/475; 359/17; 359/19; 359/30; 359/206; 399/4; 399/219; 399/220
(58) Field of Classification Search .......... 358/475, 358/500, 509; 355/40, 70; 362/3; 359/17, 359/19, 30, 206, 355; 399/4, 5, 219, 220; 250/234–236, 208.1, 200

See application file for complete search history.

(56) References Cited

U.S. PATENT DOCUMENTS

| 6,102,547 | A  | * | 8/2000  | Matsuoto et al. ............... 362/16 |
| 6,469,772 | B1 | * | 10/2002 | Itabashi ....................... 355/47 |
| 6,972,877 | B1 | * | 12/2005 | Nakamura .................. 358/474 |
| 2004/0080607 | A1 | * | 4/2004 | Tajima et al. ............... 347/243 |

FOREIGN PATENT DOCUMENTS

| JP | 2725650      | 12/1997 |
| JP | 10-322521    | 12/1998 |
| JP | 11-232912    | 8/1999  |
| JP | 2002-208386  | 7/2002  |

* cited by examiner

*Primary Examiner*—Mark K Zimmerman
*Assistant Examiner*—Miya J Cato
(74) *Attorney, Agent, or Firm*—Oblon, Spivak, McClelland, Maier & Neustadt, P.C.

(57) ABSTRACT

In a document lighting device, each of the plurality of the light emitting elements arrayed in a light source unit is arranged in a vicinity of a focal point on a cross section in a sub-scanning direction of a long-sized lens, and a convergent point is placed at a location departing a predetermined distance in the main scanning direction from a location on the surface to be illuminated included in the sub-scanning cross section.

11 Claims, 28 Drawing Sheets

READ POSITION IN MAIN SCANNING DIRECTION

READ POSITION IN MAIN SCANNING DIRECTION

READ POSITION (mm) IN MAIN SCANNING DIRECTION

READ POSITION (mm) IN MAIN SCANNING DIRECTION

READ POSITION (mm) IN MAIN SCANNING DIRECTION

READ POSITION (mm) IN MAIN SCANNING DIRECTION

READ POSITION (mm) IN SUB-SCANNING DIRECTION

READ POSITION (mm) IN MAIN SCANNING DIRECTION

READ POSITION (mm) IN SUB-SCANNING DIRECTION

READ POSITION (mm) IN MAIN SCANNING DIRECTION

READ POSITION (mm) IN SUB-SCANNING DIRECTION

DOCUMENT LIGHTING DEVICE, IMAGE READER, COLOR DOCUMENT READER, AND IMAGE FORMING DEVICE

BACKGROUND OF THE INVENTION

1. Field of the Invention

The present invention generally relates to document lighting devices used with image readers such as color document readers, image forming devices, and digital laboratories.

2. Description of the Related Art

Recently, a light emitting diode (hereinafter, simply called an LED) has been developed and brightness of a LED element has been rapidly improved. The LED generally includes advantages of a longer operating life, a higher effectiveness, a higher G-resistance, a monochromatic luminescence, and a like. One application is a document lighting device of an image reader such as a digital copier, an image scanner, and a like.

FIG. 1 is a schematic diagram showing an image forming device including image reader.

In FIG. 1, an image forming device 1000 mainly includes an image forming part 100 and an image reader 200. Other parts will be cited with reference numbers in the following explanation.

The image forming part 100 includes a latent image carrier 111 being a drum shape, and an charging roller 112 functioning as an charging means, a developing device 113, a transfer roller 114, and a cleaning device 115 are arranged around the latent image carrier 111. A corona charger can be used as the charging means. Moreover, an optical scanning device 117 for conducting an optical scan by a laser beam LB when an original information is externally received is provided as the image reader, or a like, and an exposure by an optical writing process between the charging roller 112 and the developing device 113.

When an image formation is conducted, the latent image carrier 111 being a photoconductive photoreceptor is rotated at a constant speed, a surface of the latent image carrier 111 is uniformly charged, and exposed by the optical writing process with the laser beam LB of the optical scanning device 117, so as to form the static latent image. The static latent image being formed is called a negative latent image where an image is exposed. A cassette 118 accommodating transfer papers P is detachably connected to a main body of the image forming device 100. In a mounting state as shown in FIG. 1, one sheet at upper-most of the transfer paper P accommodated in the cassette 118 is fed by the paper sheet feed roller 120, and a tip of the transfer paper P being fed is caught by a pair of resist rollers 119. The pair of resist rollers 119 sends out the transfer paper P to a transfer part in exact timing with the pair of resist rollers 119 each other to move a toner image to a transfer position on the latent image carrier 111. The transfer paper P sent out to the transfer part is overlapped with the toner image at the transfer part so that the toner image is statically transferred onto the transfer paper P by an operation of the transfer roller 114. The transfer paper P on which the toner image is transferred is sent to a fixing device 116, and the toner image is fixed at the fixing device 116. The transfer paper P is passed through a carrying passage 121, and discharged onto a tray 123 by a pair of paper discharge rollers 122. After the toner image is transferred, the surface of the latent image carrier 111 is cleaned by the cleaning device 115, so that residual toner, paper dust, and a like are eliminated. The latent image carrier 111 is a photoconductive photoreceptor, the static latent image is formed by a uniform charge and an optical scan. The static latent image being formed is visualized as the toner image.

At the image reader 200, an original 202 is placed on a contact glass 201, and is illuminated by a illuminating part (not shown) mounted to a first traveling body 203 arranged at an underpart of a contact glass 201. A reflected light from the original 202 is reflected by a fist mirror 203a of the first traveling body 203. After that, the reflected light is reflected at a fist mirror 204a and a second mirror 204b of a second traveling body 204. The reflected light is led to a reduction image forming lens 205 in order to form an image on a line sensor 206.

In a case of reading the original 202 in a longitudinal direction, the first traveling body 203 moves toward a right direction at a speed V, and simultaneously, the second traveling body 204 moves toward the right direction at half speed ½V of the first traveling body 203, so that the entire original is read out.

In general, a document lighting device used for an image reader requires approximately the same length as a width of the original in order to illuminate the original. In a use method of the LED as the document lighting device, a plurality of LED elements are arranged in an array.

The LED has superior characteristics as described above. However, in order to use the LED as an lighting device of the image reader, each of the LED elements does not have sufficient brightness. The LED is mainly used for a low-speed image reader, a device placing great importance on compactness. Accordingly, mainly, a cold-cathode fluorescent lamp is used for a high-speed image reader, and a large-scale device.

In order to mitigate the above problems, in general, a light volume of the LED array is increased by using a large number of LED elements forming the LED array. However, a light diffuses wider, it is not effective, and it requires more power and cannot improve a power saving. Moreover, effectiveness can be improved by using a shell-shaped LED having less diffusion. However, directivity is higher and non-uniformity occurs in a main scanning direction.

For example, Japanese Laid-open Patent Applications No. 11-232912 (page 2, FIG. 1 and FIG. 9) and No. 8-111545 (page 4, FIG. 3) disclose document lighting devices in that an LED array and a long-sized lens are combined. These document lighting devices attempt to improve the effectiveness by converging a light of the LED on a cross-sectional surface of each LED.

However, if this method is applied, as described in Japanese Laid-open Patent Application No. 11-232912, a center of the converged light is brighter, but a light diffuses and becomes rapidly dark at an outer part of the center of the converged light.

Since almost all of the light of the outgoing light of the LED, having an angle with respect to a cross section in the sub-scanning direction, is wasted, if a large number of LEDs are not arrayed, non-uniformity occurs in the main scanning direction.

In order to eliminate the non-uniformity of the illumination in the main scanning direction, the inventor of the present invention provides Japanese Laid-open Patent Application No. 10-322521. However, Japanese Laid-open Patent Application No. 10-322521 does not disclose a converting method in the sub-scanning direction. The inventor proposes a configuration including an optical waveguide as an optical element, which includes an incident surface in a vicinity of an emitting surface of light flux of a point source and in which the emitting surface is faced to a read area (Japanese Patent Application No. 2003-140927). In this configuration, it is possible to obtain an aimed illumination distribution preferably. However, this configuration is complicated and expensive since a light reflector in addition to the optical waveguide is required.

SUMMARY OF THE INVENTION

It is a general object of the present invention to provide document lighting devices in which the above-mentioned problems are eliminated.

A more specific object of the present invention is to provide a document lighting device in that a light source unit arranging a plurality of LEDs having a predetermined flux distribution and a long-sized lens which is not converged in a cross section in the sub-scanning direction are properly arranged, and an outgoing light of each LED is converged at a position of an original having an angle in a main scanning direction with respect to the cross section in the sub-scanning direction but is not converted at the position of the original on the cross section in the sub-scanning direction of each LED, so that a light convergence becomes higher on the cross section in the sub-scanning direction, there is no loss caused by a light diffusion in the main scanning direction, and non-uniformity in the sub-scanning direction can be reduced.

The above objects of the present invention can be achieved by a document lighting device, including: a surface to be illuminated, the surface having a length and a width; a light source unit arraying a plurality of light emitting elements in a main scanning direction where a direction along the length is defined as the main scanning direction and a direction along the width is defined as a sub-scanning direction; and a long-sized lens that is arranged between the surface to be illuminated and the light source unit, wherein a longitudinal direction of the long-sized lens is corresponded to the main scanning direction, wherein each of the plurality of the light emitting elements is arranged in a vicinity of a focal point on a cross section in the sub-scanning direction of the long-sized lens, and a convergent point is placed at a location departing a predetermined distance in the main scanning direction from a location on the surface to be illuminated included in the cross section in the sub-scanning direction.

The above objects of the present invention can be achieved by an image reader using a document lighting device, wherein the document lighting device includes: a surface to be illuminated, the surface having a length and a width; a light source unit arraying a plurality of light emitting elements in a main scanning direction where a direction along the length is defined as the main scanning direction and a direction along the width is defined as a sub-scanning direction; and a long-sized lens that is arranged between the surface to be illuminated and the light source unit, wherein a longitudinal direction of the long-sized lens is corresponded to the main scanning direction, wherein each of the plurality of the light emitting elements is arranged in a vicinity of a focal point on a cross section in the sub-scanning direction of the long-sized lens, and a convergent point is placed at a location departing a predetermined distance in the main scanning direction from a location on the surface to be illuminated included in the cross section in the sub-scanning direction.

The above objects of the present invention can be achieved by a color document reader using a document lighting device, wherein the document lighting device includes: a surface to be illuminated, the surface having a length and a width; a light source unit arraying a plurality of light emitting elements in a main scanning direction where a direction along the length is defined as the main scanning direction and a direction along the width is defined as a sub-scanning direction; and a long-sized lens that is arranged between the surface to be illuminated and the light source unit, wherein a longitudinal direction of the long-sized lens is corresponded to the main scanning direction, wherein each of the plurality of the light emitting elements is arranged in a vicinity of a focal point on a cross section in the sub-scanning direction of the long-sized lens, and a convergent point is placed at a location departing a predetermined distance in the main scanning direction from a location on the surface to be illuminated included in the cross section in the sub-scanning direction.

The above objects of the present invention can be achieved by an image forming device using an image reader, wherein the image reader includes a document lighting device, wherein the document lighting device includes: a surface to be illuminated, the surface having a length and a width; a light source unit arraying a plurality of light emitting elements in a main scanning direction where a direction along the length is defined as the main scanning direction and a direction along the width is defined as a sub-scanning direction; and a long-sized lens that is arranged between the surface to be illuminated and the light source unit, wherein a longitudinal direction of the long-sized lens is corresponded to the main scanning direction, wherein each of the plurality of the light emitting elements is arranged in a vicinity of a focal point on a cross section in the sub-scanning direction of the long-sized lens, and a convergent point is placed at a location departing a predetermined distance in the main scanning direction from a location on the surface to be illuminated included in the cross section in the sub-scanning direction.

The above objects of the present invention can be achieved by a film scanner using a document lighting device, wherein the document lighting device includes: a surface to be illuminated, the surface having a length and a width; a light source unit arraying a plurality of light emitting elements in a main scanning direction where a direction along the length is defined as the main scanning direction and a direction along the width is defined as a sub-scanning direction; and a long-sized lens that is arranged between the surface to be illuminated and the light source unit, wherein a longitudinal direction of the long-sized lens is corresponded to the main scanning direction, wherein each of the plurality of the light emitting elements is arranged in a vicinity of a focal point on a cross section in the sub-scanning direction of the long-sized lens, and a convergent point is placed at a location departing a predetermined distance in the main scanning direction from a location on the surface to be illuminated included in the cross section in the sub-scanning direction, and wherein an original is a film being translucent.

The above objects of the present invention can be achieved by a digital laboratory using a film scanner using a document lighting device, wherein the document lighting device includes: a surface to be illuminated, the surface having a length and a width; a light source unit arraying a plurality of light emitting elements in a main scanning direction where a direction along the length is defined as the main scanning direction and a direction along the width is defined as a sub-scanning direction; and a long-sized lens that is arranged between the surface to be illuminated and the light source unit, wherein a longitudinal direction of the long-sized lens is corresponded to the main scanning direction, wherein each of the plurality of the light emitting elements is arranged in a vicinity of a focal point on a cross section in the sub-scanning direction of the long-sized lens, and a convergent point is placed at a location departing a predetermined distance in the main scanning direction from a location on the surface to be illuminated included in the cross section in the sub-scanning direction, and wherein an original is a film being translucent.

The above objects of the present invention can be achieved by a document lighting device, including: a surface to be illuminated, the surface having a length and a width; a light source unit arraying a plurality of light emitting elements in a main scanning direction where a direction along the length is defined as the main scanning direction and a direction along the width is defined as a sub-scanning direction; and a long-sized lens that is arranged between the surface to be illuminated and the light source unit, wherein a longitudinal direction of the long-sized lens is corresponded to the main scanning direction, wherein the document lighting device illuminates light flux from the light source unit onto the surface to be illuminated through the long-sized lens, wherein when in surfaces through which the light flux passes in a cross section of the sub-scanning direction of the long-sized lens, a surface R1 denotes a surface facing the light source unit, a distance D(LED) denotes between a location on the cross section at an edge of the light emitting element of the light source unit and the surface R1, and a distance D(BF) denotes a distance from a focal point location at a side of the surface R1 to the surface R1, a following expression is satisfied: $D(LED) < D(BF)$.

The above objects of the present invention can be achieved by a document lighting device, including: a surface to be illuminated, the surface having a length and a width; a light source unit arraying a plurality of light emitting elements in a main scanning direction where a direction along the length is defined as the main scanning direction and a direction along the width is defined as a sub-scanning direction; and a long-sized lens that is arranged between the surface to be illuminated and the light source unit, wherein a longitudinal direction of the long-sized lens is corresponded to the main scanning direction, wherein the document lighting device illuminates light flux from the light source unit onto the surface to be illuminated through the long-sized lens, wherein the document lighting device illuminates light flux from the light source unit, to which the long-sized lens applies a convergence, on the surface to be illuminated, wherein each outvoting light of the plurality of light emitting elements is parallel light, becomes convergent light in a direction having a predetermined convergent angle $\theta f$ with respect to the cross section in the sub-scanning direction, and when $\beta$ denotes an imaging magnification of the light element in the sub-scanning direction at a convergent point, a following expression is satisfied: $\beta \geq 1$.

The above objects of the present invention can be achieved by a image reader using a document lighting device, wherein the document lighting device includes: surface to be illuminated, the surface having a length and a width; light source unit arraying a plurality of light emitting elements in the main scanning direction where a direction along the length is defined as the main scanning direction and a direction along the width is defined as the sub-scanning direction; and long-sized lens that is arranged between the surface to be illuminated and the light source unit, wherein a longitudinal direction of the long-sized lens is corresponded to the main scanning direction, herein the document lighting device illuminates light flux from the light source unit onto the surface to be illuminated through the long-sized lens, herein when in surfaces through which the light flux passes in a cross section of the sub-scanning direction of the long-sized lens, a surface R1 denotes a surface facing the light source unit, a distance D(LED) denotes between a location on the cross section at an edge of the light emitting element of the light source unit and the surface R1, and a distance D(BF) denotes a distance from a focal point location at a side of the surface R1 to the surface R1, a following expression is satisfied: $(LED) < D(BF)$.

The above objects of the present invention can be achieved by a color document reader using a document lighting device, wherein the document lighting device comprises: a surface to be illuminated, the surface having a length and a width; a light source unit arraying a plurality of light emitting elements in a main scanning direction where a direction along the length is defined as the main scanning direction and a direction along the width is defined as a sub-scanning direction; and a long-sized lens that is arranged between the surface to be illuminated and the light source unit, wherein a longitudinal direction of the long-sized lens is corresponded to the main scanning direction, wherein the document lighting device illuminates light flux from the light source unit onto the surface to be illuminated through the long-sized lens, wherein when in surfaces through which the light flux passes in a cross section of the sub-scanning direction of the long-sized lens, a surface R1 denotes a surface facing the light source unit, a distance D(LED) denotes between a location on the cross section at an edge of the light emitting element of the light source unit and the surface R1, and a distance D(BF) denotes a distance from a focal point location at a side of the surface R1 to the surface R1, a following expression is satisfied: $D(LED) < D(BF)$.

The above objects of the present invention can be achieved by a image forming device using an image reader using a document lighting device, wherein the document lighting device includes: a surface to be illuminated, the surface having a length and a width; a light source unit arraying a plurality of light emitting elements in a main scanning direction where a direction along the length is defined as the main scanning direction and a direction along the width is defined as a sub-scanning direction; and a long-sized lens that is arranged between the surface to be illuminated and the light source unit, wherein a longitudinal direction of the long-sized lens is corresponded to the main scanning direction, wherein the document lighting device illuminates light flux from the light source unit onto the surface to be illuminated through the long-sized lens, wherein when in surfaces through which the light flux passes in a cross section of the sub-scanning direction of the long-sized lens, a surface R1 denotes a surface facing the light source unit, a distance D(LED) denotes between a location on the cross section at an edge of the light emitting element of the light source unit and the surface R1, and a distance D (BF) denotes a distance from a focal point location at a side of the surface R1 to the surface R1, a following expression is satisfied: $D(LED) < D(BF)$.

The above objects of the present invention can be achieved by an image forming device using color document reader using a document lighting device, wherein the document lighting device includes: a surface to be illuminated, the surface having a length and a width; a light source unit arraying a plurality of light emitting elements in a main scanning direction where a direction along the length is defined as the main scanning direction and a direction along the width is defined as a sub-scanning direction; and a long-sized lens that is arranged between the surface to be illuminated and the light source unit, wherein a longitudinal direction of the long-sized lens is corresponded to the main scanning direction, wherein the document lighting device illuminates light flux from the light source unit onto the surface to be illuminated through the long-sized lens, wherein when in surfaces through which the light flux passes in a cross section of the sub-scanning direction of the long-sized lens, a surface R1 denotes a surface facing the light source unit, a distance D(LED) denotes between a location on the cross section at an edge of the light emitting element of the light source unit and the surface R1, and a distance D(BF) denotes a distance from a focal point location at a side of the surface R1 to the surface R1, a following expression is satisfied: D(LED)<D(BF).

BRIEF DESCRIPTION OF THE DRAWINGS

In the following, embodiments of the present invention will be described with reference to the accompanying drawings.

DESCRIPTION OF THE PREFERRED EMBODIMENTS

[Fist Aspect of the Invention]

Figure 2:
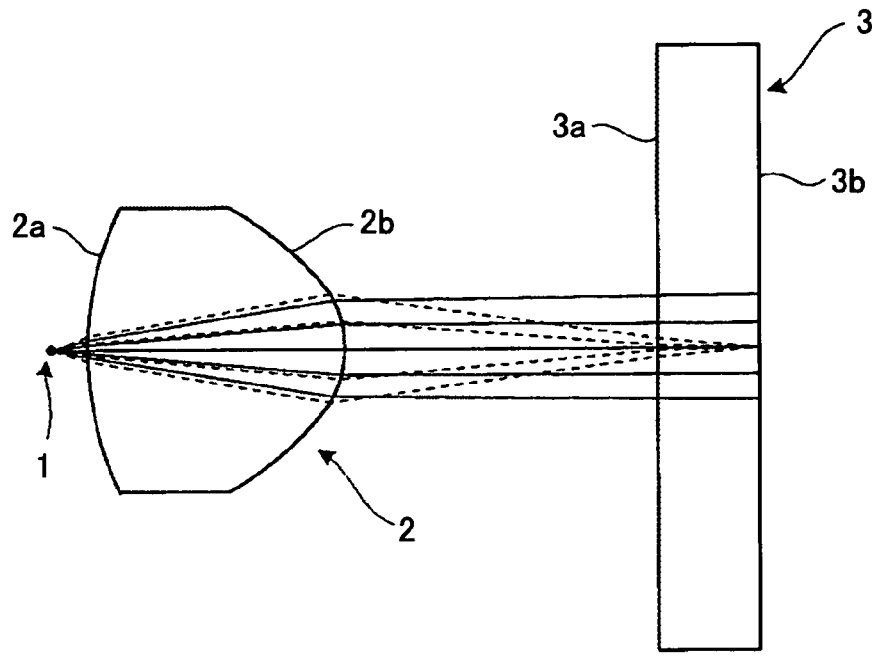
FIG. 2 is a sectional side view showing a basic concept of a document lighting device according to the present invention.

FIG. 2 is a sectional side view showing a basic concept of a document lighting device according to the present invention.

Figure 3:
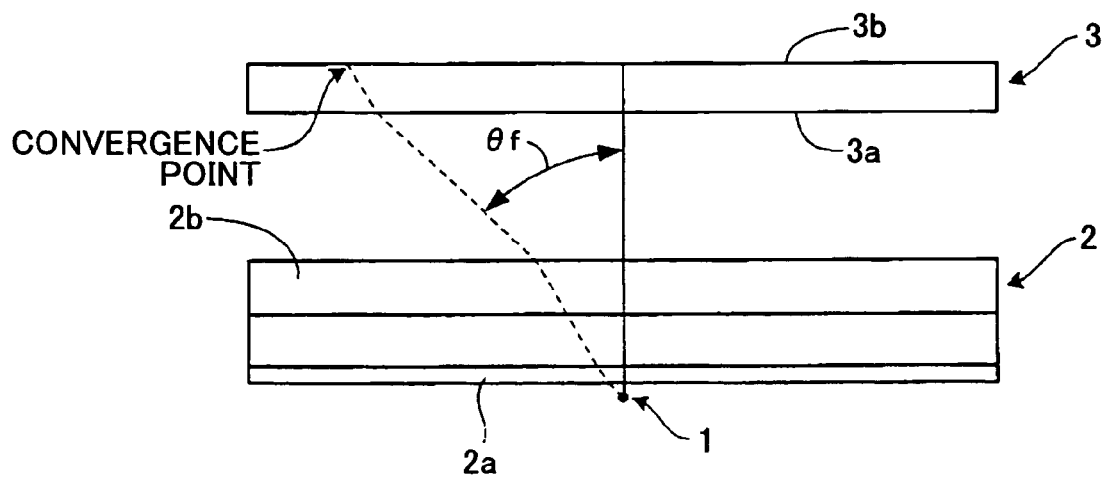
FIG. 3 is a plan view showing the basic concept of the document lighting device according to the present invention.

FIG. 3 is a plan view showing the basic concept of the document lighting device according to the present invention.

In both FIG. 2 and FIG. 3, a point source 1, long-sized lens 2, and a contact glass 3 placed on an anterior surface of a surface 3a to be illuminated are shown.

A light incident surface 2a of the long-sized lens 2 is arranged in a vicinity of a light-emitting surface of the point source 1, and the surface 3a to be illuminated is arranged at a position of a predetermined distance from a light-emitting surface 2b of the long-sized lens 2. The surface 3a to be illuminated is matched with a surface 3b (hereinafter, called rear surface) being an opposite side to the point source 1.

For example, it is assumed that the point source 1 has a luminous point being sufficiently small such as the LED (Light Emitting Diode), and a size of the luminous point can be recognized as a dot when compared with a width of a A4 size sheet if an A4 size of sheet is considered as a size of the surface 3a to be illuminated.

The long-sized lens 2, as it called, is long in one direction as shown in FIG. 3, and a cross-sectional surface orthogonal to a longitudinal direction has the same lens shape at all locations in principle. Even in a case in that a lens is not straight in the longitudinal direction and a shape of the cross sectional surface is changed at any location, the lens is included in long-sized lenses. Regardless of a detailed lens shape, this long-sized lens having this formation is called cylinder lens or cylindrical lens.

This document lighting device is used for a digital copier and an image scanner. In this case, one direction of an original is corresponded to the longitudinal direction of the long-sized lens 2 and the original is place upon the rear surface 3b of the contact glass. Since an illumination light condenses along lines with the longitudinal direction, the entire surface of the original cannot simultaneously readout. Accordingly, the surface of the original and the document lighting device relatively move toward opposite directions on the original. In this case, a line direction of the illumination light is called main scanning direction, and the above-described relative movement direction is called sub-scanning direction. FIG. 2 shows the scanning cross section. If the cross section in the sub-scanning direction is simply described, there are cross sections in the sub-scanning direction innumerably. In the present invention, the cross section in the sub-scanning direction is a cross section including a light source.

In the present invention, in the cross section in the sub-scanning direction, an outgoing light of the LED is collimated and illuminates an original surface. However, in FIG. 3, a luminous flux emitting toward a direction shown by a broken line does not become a parallel luminous flux after the luminous flux is emitted from the long-sized lens 2. The luminous flux rather becomes a convergent luminous flux. This phenomenon is due to curvatures of an apparent incident surface and an apparent emitting surface with respect to the luminous flux become larger and a distance between the incident surface and the emitting surface becomes longer, since the luminous flux diagonally traverses with respect to the long-sized lens 2. An angle θf in FIG. 3 is shown as an angle where a convergent point places just on the surface 3a to be illuminated. For the sake of convenience, this angle θf is called a convergent angle. Hereinafter, in general, an angle θ denotes an angle between the luminous flux emitting a cross section perpendicular to the original and the cross section in the sub-scanning direction. This angle θ is called bias luminous flux.

As described above, not all luminous fluxes emitted from the point source 1 become approximately parallel to the original surface, and there are luminous fluxes converged on the original surface. As the angle θ of the bias luminous flux emitted from the point source 1 becomes larger, a conjugate length between the bias luminous flux and the point source 1 which is originally infinite becomes gradually shorter, and then the conjugate length is converged on the original surface at the angle θf. When the angle θ becomes larger than the convergent angle θf, the convergent point enters to the contact glass.

Figure 4:
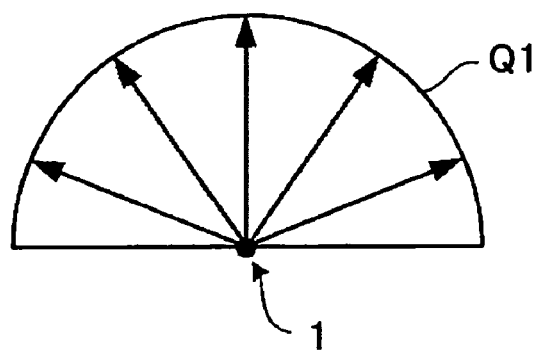
FIG. 4 is a diagram showing a example in that a flux distribution of a point source is a uniform distribution.

FIG. 4 is a diagram showing a example in that a flux distribution of the point source is a uniform distribution.

Figure 5:
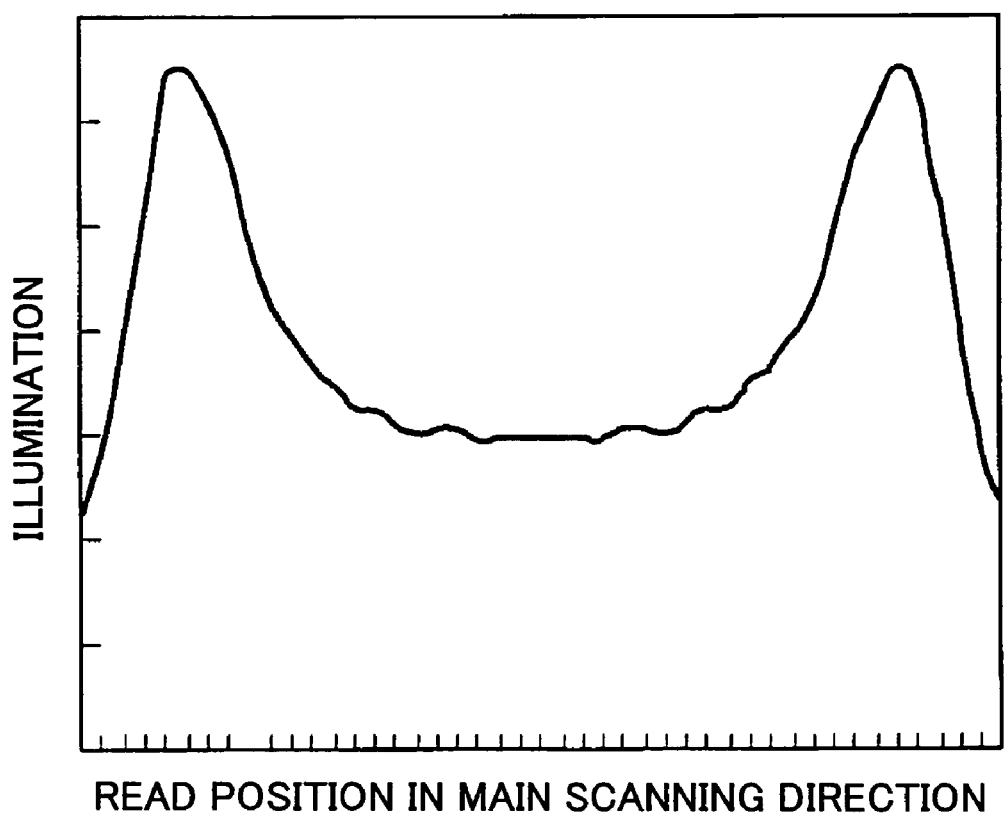
FIG. 5 is a diagram showing illumination of a main scanning direction of the point source having the uniform distribution.

FIG. 5 is a diagram showing illumination of the main scanning direction of the point source having the uniform distribution.

A distribution Q1, in which an uniform light energy is emitted with respect to all directions of a solid angle within a range of 180° from the point source 1, is called uniform distribution.

A light emitted from LED gradually changes to be a converted luminous light as the angle θ of the light becomes larger, that is, the light departs from a front side of the LED on the surface 3a to be illuminated. If it is assumed that all directions are uniform in the flux distribution of the LED, the illumination on the original gradually becomes higher toward an end of the main scanning direction as shown in FIG. 4, and two peaks such as edges are formed in a vicinity of the convergent angle θf. In this illumination distribution, in order to use as the document lighting device, a flat part near a center part is too narrow to cover a width of the original. However, it is impossible for a practical LED to obtain the flux distribution Q1.

Figure 6:
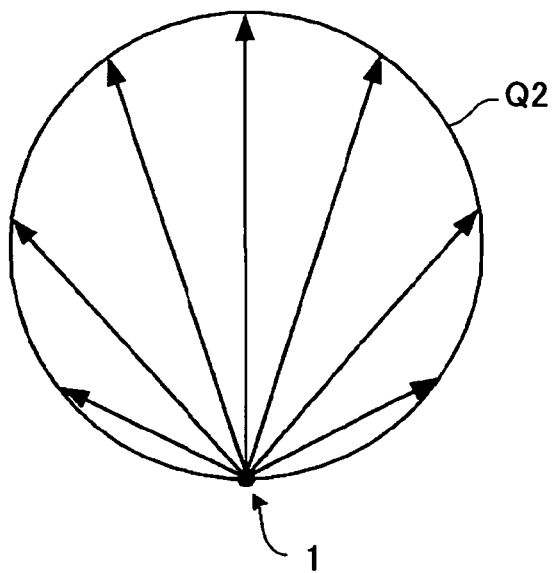
FIG. 6 is a diagram showing an example in that the flux distribution of the point source is the Lambert distribution.

FIG. 6 is a diagram showing an example in that the flux distribution of the point source is the Lambert distribution.

Figure 7:
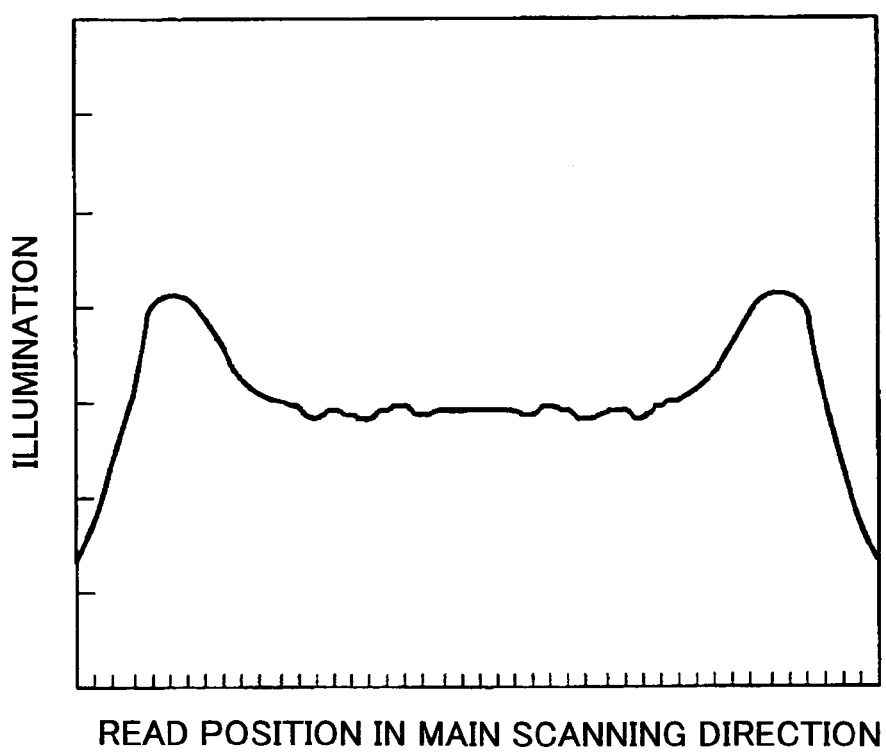
FIG. 7 is a diagram showing the illumination in the main scanning direction of the point source of the Lambert distribution.

FIG. 7 is a diagram showing the illumination in the main scanning direction of the point source of the Lambert distribution.

A case in that an intensity distribution of the light energy emitted from the point source 1 becomes a spherical shape Q2. In a case of this distribution, a maximum energy radiation is conducted in a normal direction facing the light source. A radiation direction of a maximum energy is defined as an angle θ=0°. As the angle θ becomes wider, a light energy of the luminous flux is reduced, and the energy is reduced to be half a maximum value (half value) at an angle θh=60°. Then, the energy becomes one quarter the maximum value. The angle θh=60° is called half-value angle of the Lambert distribution.

By using the point source 1 having the flux distribution Q2 described above, a decrease of a light intensity caused by a characteristic of the flux distribution and an increase of the light intensity caused by a converging action of a lens are interfered to be equal each other. Compared with the illumination shown in FIG. 5, the illumination at the peak parts is lowered.

In the illumination distribution shown in FIG. 7, the flat part becomes wider around the center part, so that the outgoing light of the LED can be effectively used wider in the main scanning direction.

By arranging a plurality of the LEDs described above, it is possible to reduce the non-uniformity in the main scanning direction even if a small number of the LEDs are arrayed, since each LED has a wider usable illumination range in the main scanning direction.

Moreover, in this case, the two peaks in vicinities of both edges of the main scanning direction of each LED are mutually connected. As a result, it is possible to form the illumination distribution of a higher convergence in the sub-scanning direction anywhere in the main scanning direction.

In the above-described configuration according to the present invention, the converging action does not occur on the cross section in the sub-scanning direction as described above. Accordingly, as another advantage of using the configuration according to the present invention, a curvature is moderate more than a lens having the converging action. Therefore, it is possible to set NA, so that a light volume from the LED can be inevitably increased.

First Embodiment

Figure 8A:
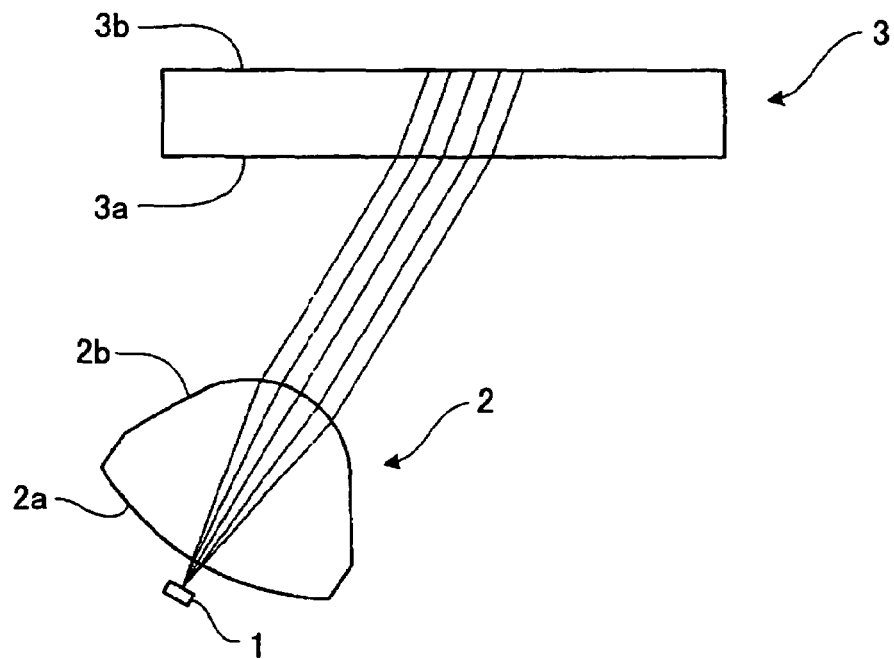
FIG. 8A is a diagram showing a state of the luminous flux on a cross section in the sub-scanning direction, according to a first embodiment of the present invention.
Figure 8B:
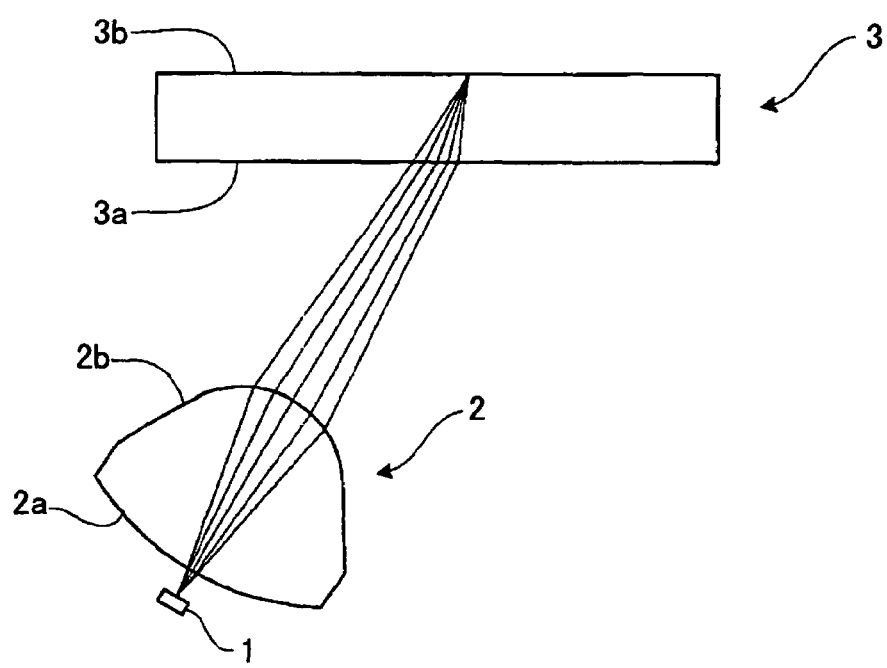
FIG. 8B is a diagram showing a state of a bias luminous flux having the convergent angle θf=45°, according to the first embodiment of the present invention.

A configuration according to a first embodiment of the present invention will be described with reference to FIG. 8A and FIG. 8B. FIG. 8A is a diagram showing a state of the luminous flux on the cross section in the sub-scanning direction, according to the first embodiment of the present invention, and FIG. 8B is a diagram showing a state of the bias luminous flux having the convergent angle θf=45°, according to the first embodiment of the present invention.

Figure 9:
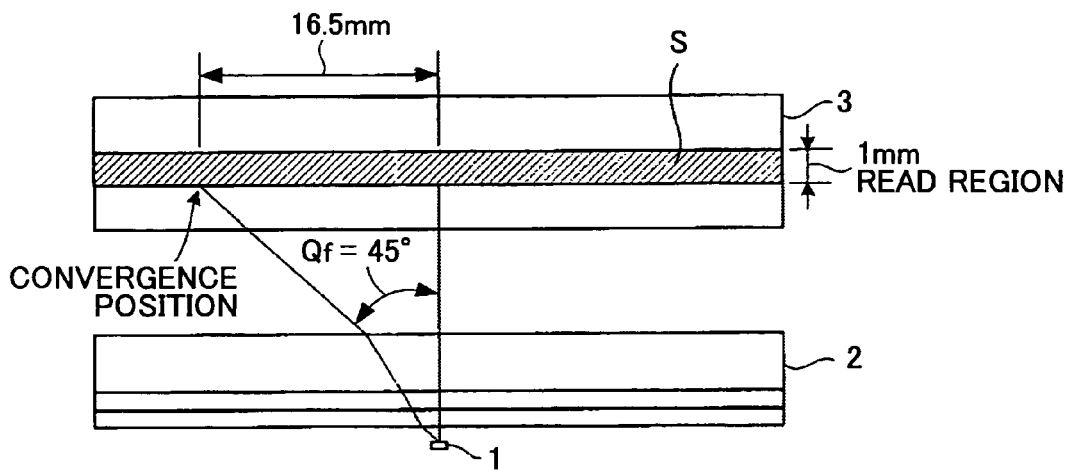
FIG. 9 is an anomalistic plan view showing a configuration according to the first embodiment of the present invention.

FIG. 9 is an anomalistic plan view showing the configuration according to the first embodiment of the present invention.

Figure 10:
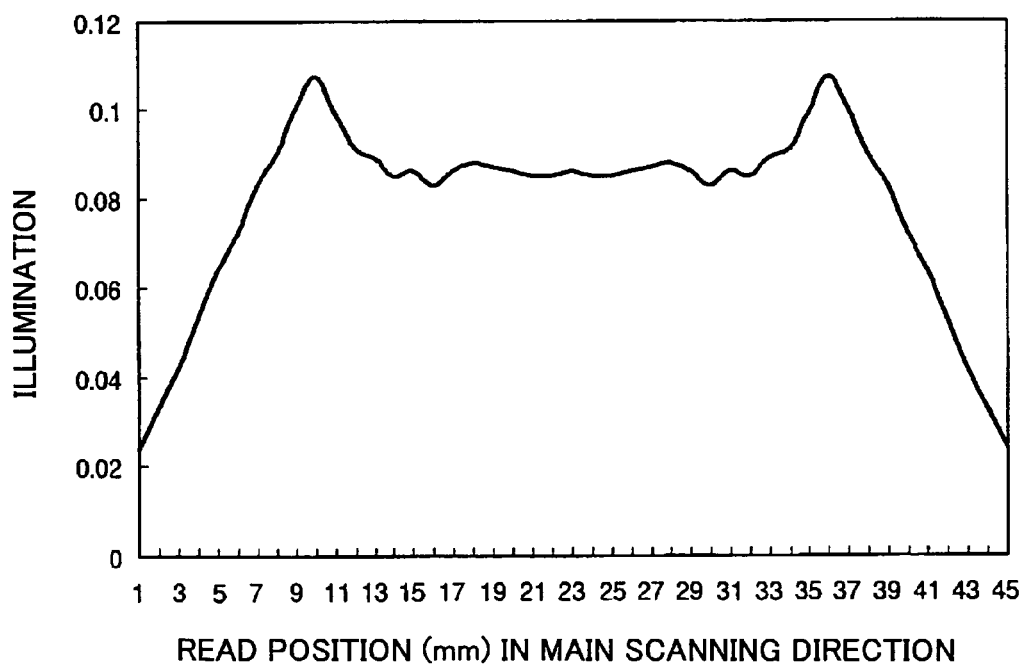
FIG. 10 is a diagram showing the illumination distribution in the main scanning direction of a surface to be illuminated in the configuration according to the first embodiment of the present invention.

FIG. 10 is a diagram showing the illumination distribution in the main scanning direction of the surface to be illuminated in the configuration according to the first embodiment of the present invention.

A specification of the first embodiment is shown as follows:

Long-sized lens_A
  cross section form
    (radius R1 of the cross section in the sub-scanning direction at a side of the light incident surface 2a, and radius R2 of the cross section in the sub-scanning direction at a side of the light-emitting surface 2b)
  R1=10
  R2=−2.887 (circular cone multiplier K=−0.837 on an elliptic surface)
  center thickness: 7.2 (mm)
  width of main scanning direction: 50 (mm)
  material: nd=1.491 and vd=57.2

LED_A
  flux distribution: Lambert distribution (Q2)
  intensity distribution on emission surface: uniform
  emission surface size: 1 (mm)×1 (mm)
  quantity: one
  luminous efficiency: 1 (W)
contact glass
  center thickness: 3.2 (mm)
  material: nd=1.517 and id=64.2
location relationship
  interval between LED and surface 2a of long-sized lens: 1 (mm)
  interval between surface 2b of long-sized lens and contact glass: 10 (mm)
  inclination with respect to normal line of surface of contact glass of optical axis of long-sized lens: 30 degrees
  surface to be illuminated (surface of original): rear surface of contact glass As shown in FIG. 8A and FIG. 8B, the luminous flux is set to be a parallel, and the lens 2 and others are selected to converge onto the surface 3a to be illuminated at the angle θf=45°. In this embodiment, the angle θf is greater than the angle θh (θf<θh).

FIG. 9 shows a view from a vertical direction to the optical axis regarding the long-sized lens 2 the luminous flux and shows a view from a vertical direction with respect to the surface 3a to be illuminated regarding the contact glass 3.

In FIG. 8B, the bias luminous flux is shown as a single line that converges from one point to another point. In practice, as described in the above specification, the LED has a 1 mm angle. It has been assumed from FIG. 8B that since a scale of an image formation on the surface 3a to be illuminated is magnified greater than an unmagnified scale, a width in the sub-scanning direction of the converted luminous light on the surface 3a to be illuminated is wider than 1 mm.

In FIG. 9, the bias luminous flux emitted at the angle θf=45° converges at a location of 16.5 mm from the center. An area having 1 mm width in the sub-scanning direction of the surface to be illuminated is denoted by an area S. The illumination distribution in the area S is obtained and is shown in a graph shown in FIG. 10. The graph shows a result from performing integration in the sub-scanning direction with respect to the above 1 mm width. An energy unit mW/m² is used in place of a unit of the illumination of a vertical axis. The main scanning direction is plotted at intervals of 45 mm with respect to the long-sized lens having a 50 mm length. The outgoing light of the LED can be used in the main scanning direction without wasted diffusion.

In this embodiment, the bias luminous flux having an incident angle being substantially near 45° is used. In general, the greater the incident angle, the greater loss of the light volume a surface reflection causes. Antireflection film can be formed to prevent the loss of the light volume. However, it costs more. In addition, since the radiation energy at an outer angle far from the half-value angle θh rapidly becomes lower, it is not practical to choose the outer angle far from the half-value angle θh as the convergent angle θf.

Second Embodiment

Figure 11:
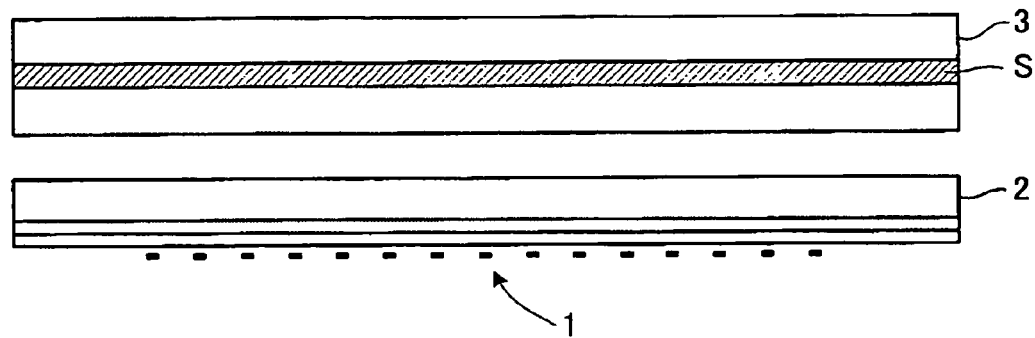
FIG. 11 is an anomalistic plan view showing a configuration according a second embodiment of the present invention.

FIG. 11 is an anomalistic plan view showing a configuration according a second embodiment of the present invention.

Figure 12:
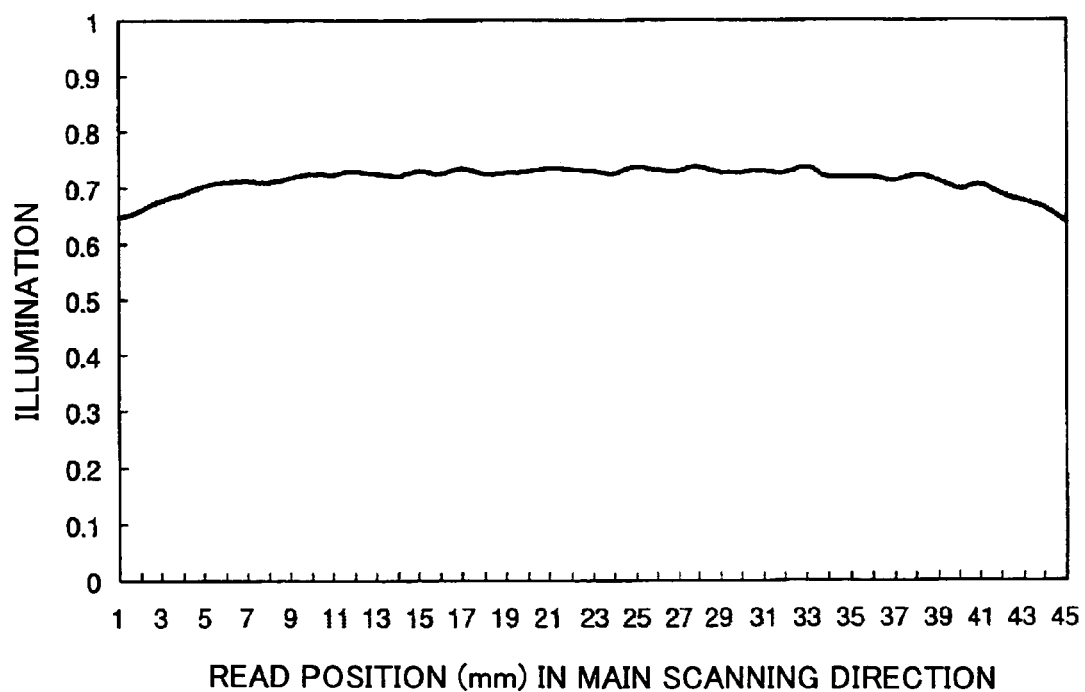
FIG. 12 is a diagram showing an illumination distribution in a main scanning direction of a surface to be illuminated in a configuration according the second embodiment of the present invention.

FIG. 12 is a diagram showing an illumination distribution in a main scanning direction of a surface to be illuminated in a configuration according the second embodiment of the present invention.

Figure 13:
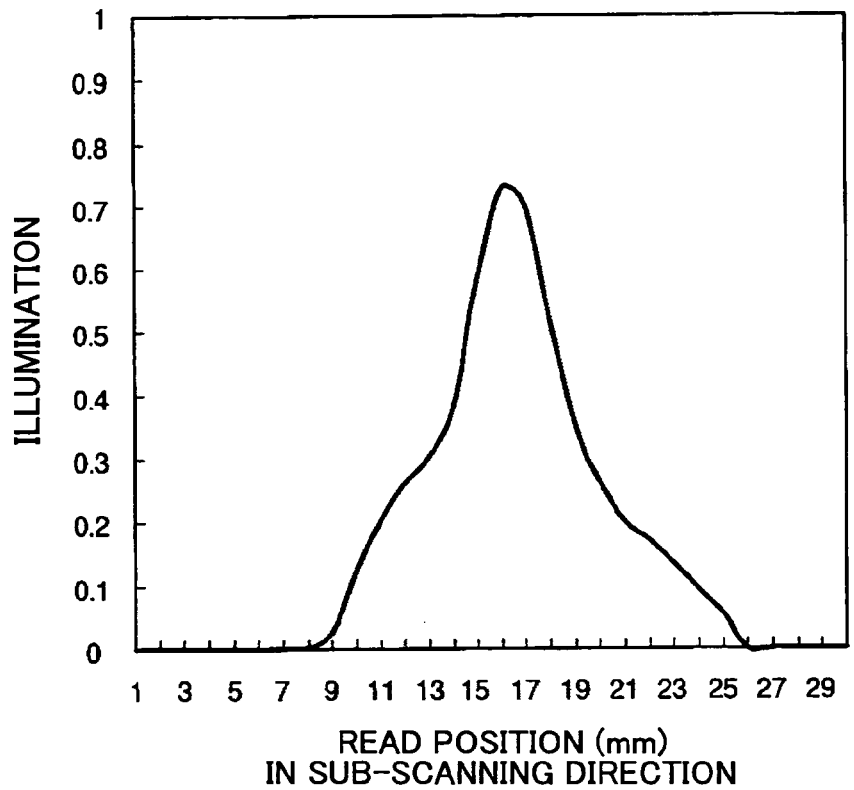
FIG. 13 is a diagram showing the illumination distribution in a sub-scanning direction of the surface to be illuminated in the configuration according the second embodiment of the present invention.

FIG. 13 is a diagram showing the illumination distribution in a sub-scanning direction of the surface to be illuminated in the configuration according the second embodiment of the present invention.

In the second embodiment, different from the first embodiment, a width of the long-sized lens 2 in the main scanning direction is set to be 100 (mm), and a quantity of the light sources is increased. Others are the same as the first embodiment. In the second embodiment, 15 LED_As are arrayed at 5 mm pitches. Accordingly, a distance between centers of the light sources at both edges is 70 mm, and the light sources illuminate from an outside of the 45 mm width of the main scanning direction.

The illumination distribution in the main scanning direction is approximately flat all over the whole of the illumination distribution.

FIG. 13 is a diagram showing the illumination distribution in the sub-scanning direction of the surface to be illuminated in the configuration according to the second embodiment of the present invention. In the illumination distribution shown in FIG. 13, a center of the 45 mm width of the main scanning direction is plotted at 30 mm intervals in the sub-scanning direction. At 1 mm in a read area in the sub-scanning direction is a peak location in FIG. 13, and a collection of light is performed well.

Third Embodiment

Figure 14:
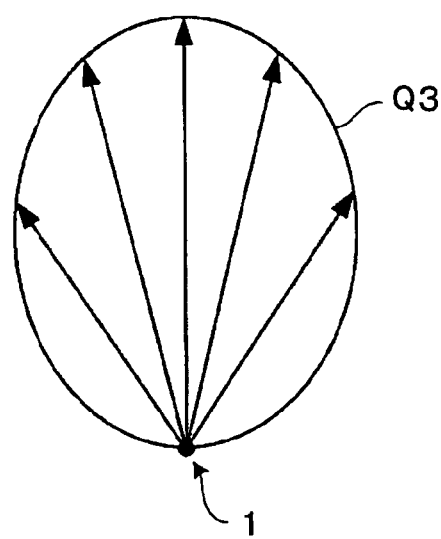
FIG. 14 is a diagram showing an example in that a flux distribution of a light source is a cosine square distribution, according to a third embodiment of the present invention.

FIG. 14 is a diagram showing an example in that a flux distribution of a light source is a cosine square distribution, according to a third embodiment of the present invention.

Figure 15:
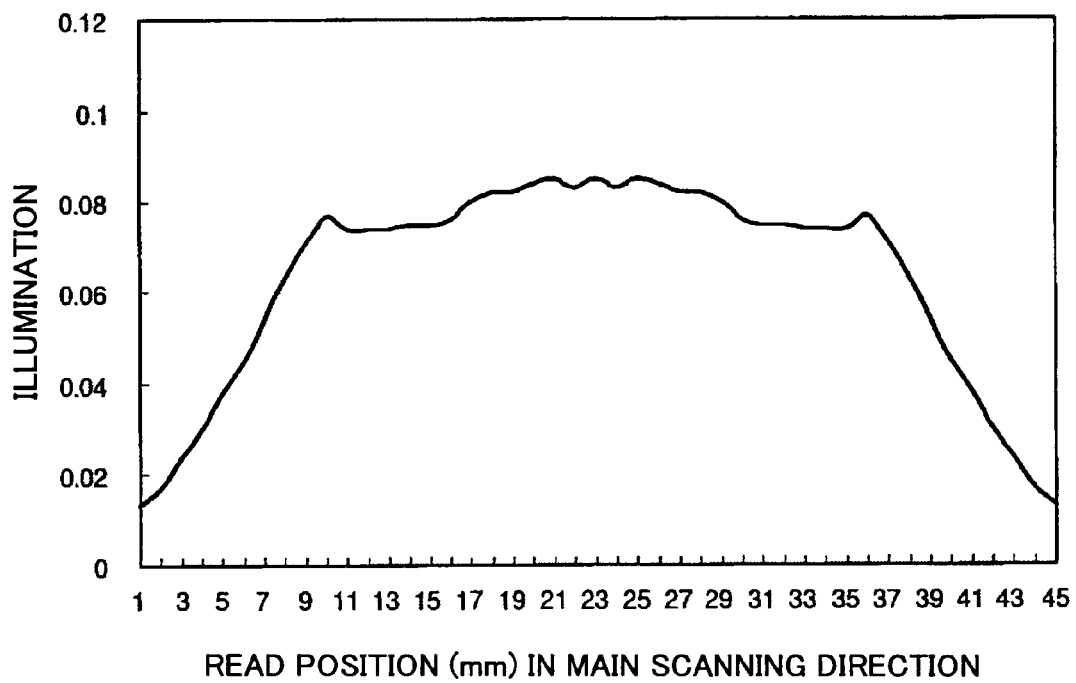
FIG. 15 is a diagram showing an illumination distribution in a main scanning direction of a point source having the cosine square distribution in a configuration according to the third embodiment of the present invention.

FIG. 15 is a diagram showing an illumination distribution in a main scanning direction of a point source having the cosine square distribution in a configuration according to the third embodiment of the present invention.

In the third embodiment, different from the first embodiment, a LED_B in which the flux distribution is the Lambert distribution is used in place of the LED_A in which the flux distribution is a cosine square distribution Q3. Others are the same as the first embodiment.

The cosine square distribution Q3 is a distribution in that light energy, which emits toward a direction inclining at the angle θ with respect to a normal line of an emission surface, is reduced at a $\cos^2\theta$ ratio in a normal direction. In this case of the cosine square distribution Q3, the light energy at the angle θh=45° becomes half light energy (half-value) of the normal direction. Accordingly, in the third embodiment, the convergent angle θf is equal to the half-value angle θh.

Even if the LED_B having higher light intensity at a center is used, it is possible to effectively use outgoing light by matching converging action and flux distribution of the LED_B.

Fourth Embodiment

Figure 16:
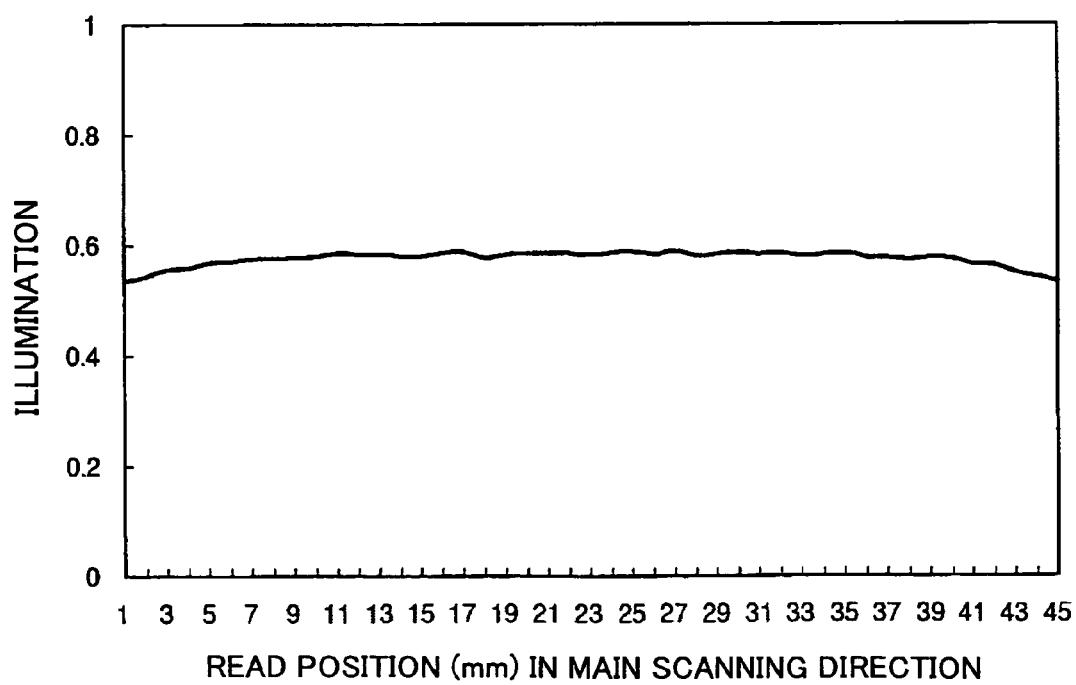
FIG. 16 is a diagram showing an illumination distribution in a main scanning direction of a surface to be illuminated in a configuration according a fourth embodiment of the present invention.

FIG. 16 is a diagram showing an illumination distribution in a main scanning direction of a surface to be illuminated in a configuration according a fourth embodiment of the present invention.

Figure 17:
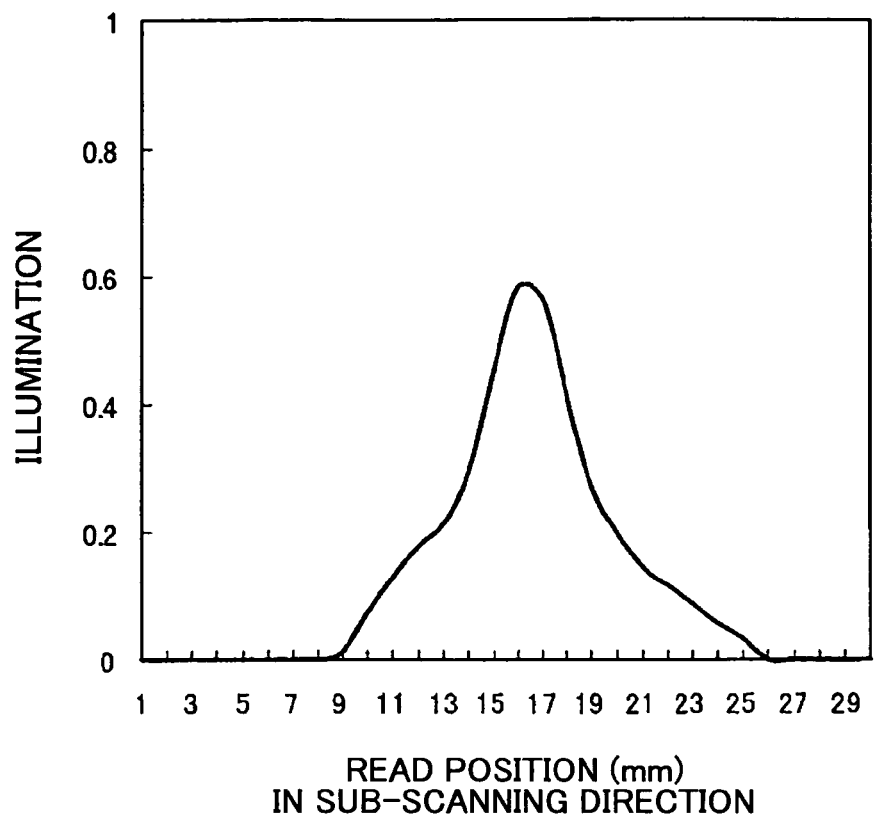
FIG. 17 is a diagram showing the illumination distribution in a sub-scanning direction of the surface to be illuminated in the configuration according the fourth embodiment of the present invention.

FIG. 17 is a diagram showing the illumination distribution in a sub-scanning direction of the surface to be illuminated in the configuration according the fourth embodiment of the present invention.

A configuration in the fourth embodiment is the same as the second embodiment, but the LED_B is used to array.

In the illumination distribution shown in FIG. 17, a center of 45 mm width of the main scanning direction is plotted at 30 mm intervals in the sub-scanning direction. At 1 mm in the read area in the sub-scanning direction is a peak location in FIG. 17, and a collection of light is performed well.

Fifth Embodiment

Figure 18:
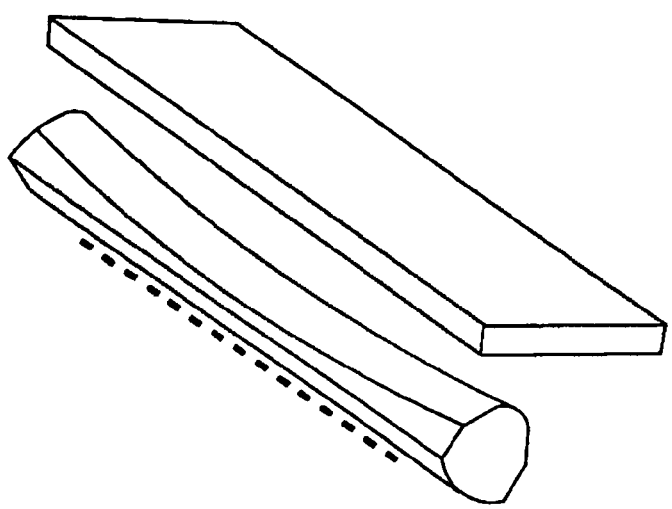
FIG. 18 is a perspective view of a configuration according to a fifth embodiment of the present invention.

FIG. 18 is a perspective view of a configuration according to a fifth embodiment of the present invention.

Figure 19:
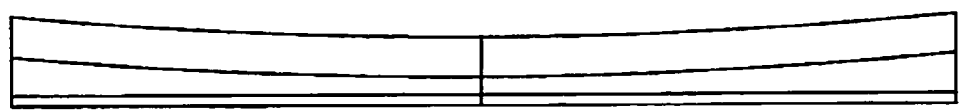
FIG. 19 is a plan view of a long-sized lens used in the fifth embodiment of the present invention.

FIG. 19 is a plan view of a long-sized lens used in the fifth embodiment of the present invention.

Figure 20:
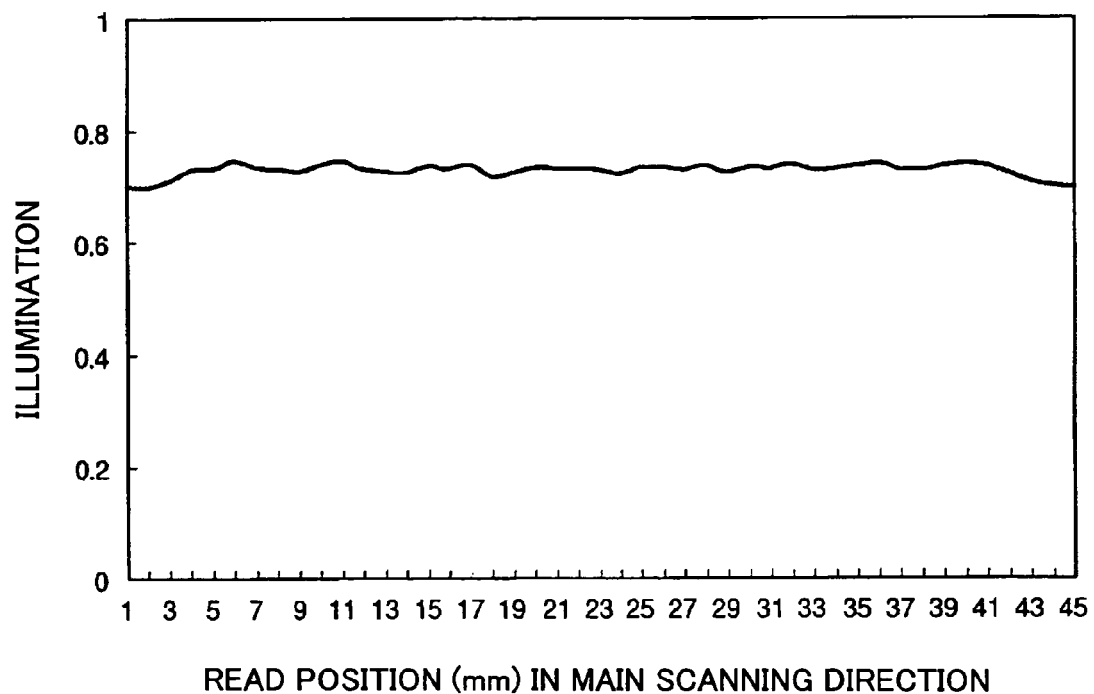
FIG. 20 is a diagram showing an illumination distribution in a main scanning direction of a surface to be illuminated in a configuration according the fifth embodiment of the present invention.

FIG. 20 is a diagram showing an illumination distribution in a main scanning direction of a surface to be illuminated in a configuration according the fifth embodiment of the present invention.

Figure 21:
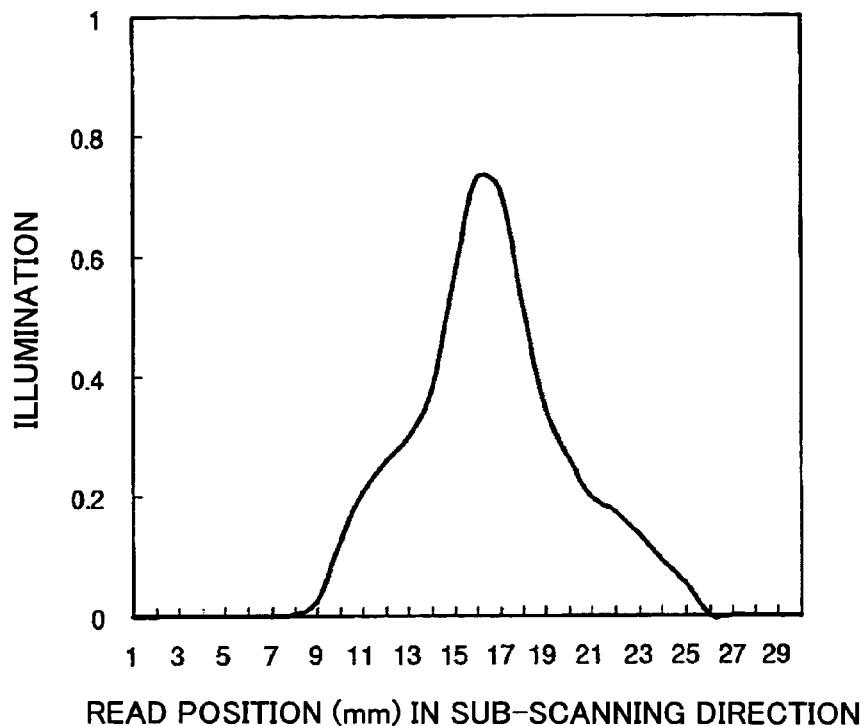
FIG. 21 is a diagram showing the illumination distribution in a sub-scanning direction of the surface to be illuminated in the configuration according the fifth embodiment of the present invention.

FIG. 21 is a diagram showing the illumination distribution in a sub-scanning direction of the surface to be illuminated in the configuration according the fifth embodiment of the present invention.

In the fifth embodiment, without increasing a quantity of LEDs, illumination at edges of an original can be improved. A basic configuration of the fifth embodiment is the same as that of the second embodiment, but a 500 mm curvature is applied to the light-emitting surface 2b of the long-sized lens in the main scanning direction, and a cross-sectional surface in the main scanning direction is formed so that the long-sized lens becomes a concave lens, and a long-sized lens_B, which cross-sectional surface in the sub-scanning direction forms a convex lens having the same curvature, is used.

In the illumination distributions in the main scanning direction in the second embodiment and the fourth embodiment (FIG. 12 and FIG. 16), a plurality of light sources, which spread to 70 mm with respect to the 45 mm width of the surface to be illuminated, are used. However, the illumination is slightly deteriorated at both edges of the 45 mm width. This problem can be improved by changing a pitch of an array or by using an electrical correction. One improvement method is shown in the fifth embodiment. That is, the curvature shown in FIG. 19 is applied the light-emitting surface of the long-sized lens in a longitudinal direction, so that deterioration of the illumination can be improved, an illumination distribution can be approximately constant all over the whole of a desired with (45 mm in the fifth embodiment) of the original.

As an alternate improvement method, in a curved surface of either one of the light incident surface and the light-emitting surface in a necessary direction of the main scanning direction and the sub-scanning direction (maybe both directions), each cross-sectional surface corresponding to the necessary direction or directions may be formed to be a quadratic curve (for example, an ellipse, a parabola, and a like) other than a circle. In a case in that an advanced design and an advanced manufacturing can be performed, it is possible to apply an even-number order curve being higher order such as a biquadratic curve. For the sake of convenience, this even-number order curve is called a non-circular curve.

Sixth Embodiment

Figure 22:
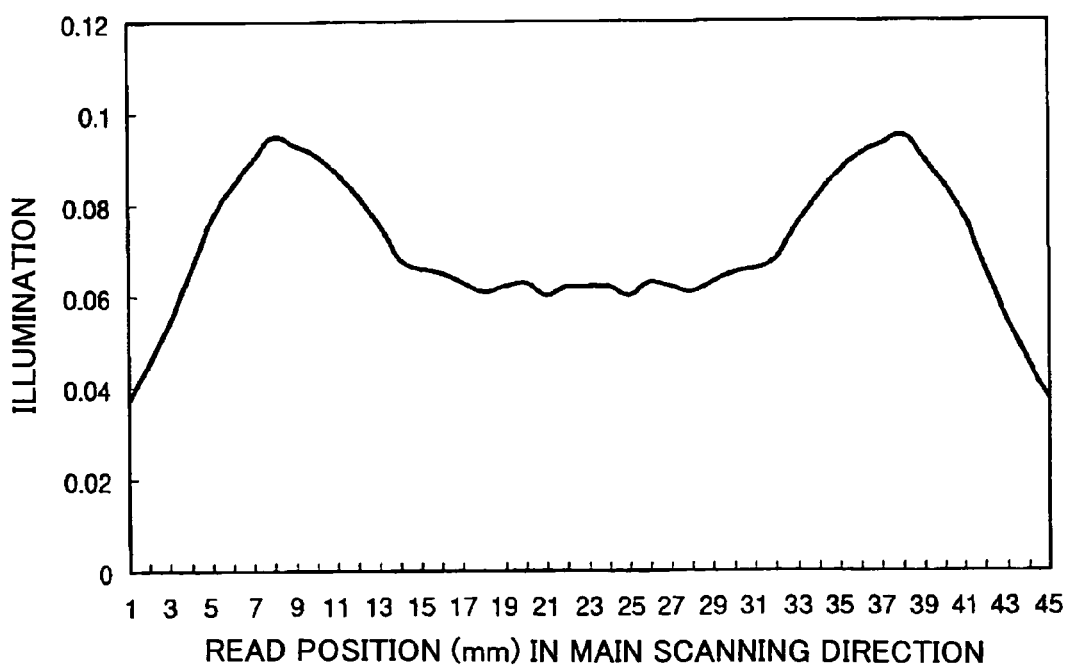
FIG. 22 is a diagram showing an illumination distribution in a main scanning direction of a surface to be illuminated in a configuration according to a sixth embodiment of the present invention.

FIG. 22 is a diagram showing an illumination distribution in a main scanning direction of a surface to be illuminated in a configuration according to a sixth embodiment of the present invention.

Figure 23:
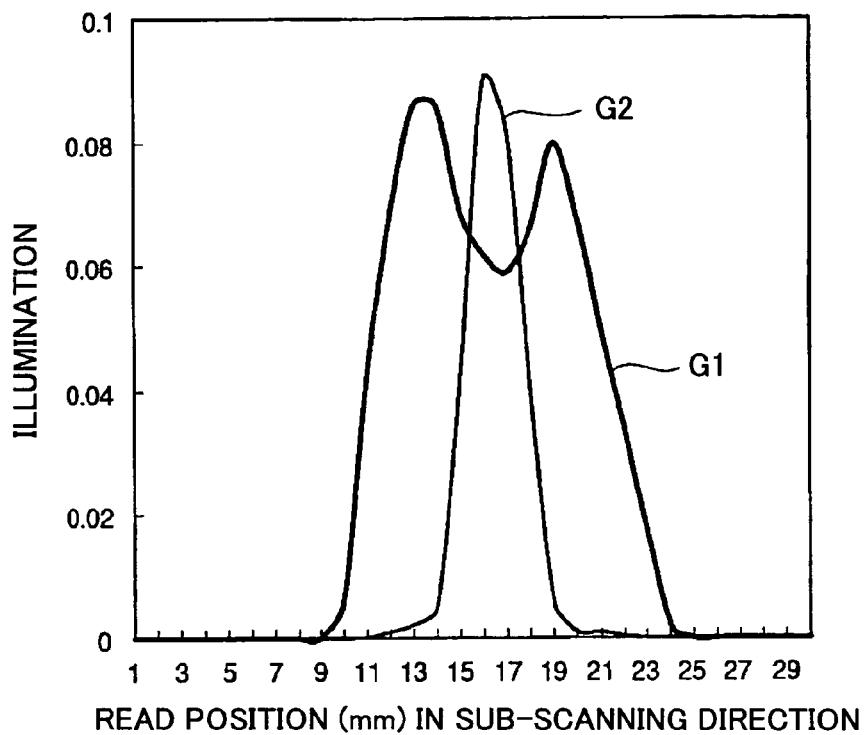
FIG. 23 is a diagram showing an illumination distribution in a main scanning direction of a surface to be illuminated in a configuration according to the sixth embodiment of the present invention.

FIG. 23 is a diagram showing the illumination distribution in a sub-scanning direction of the surface to be illuminated in the configuration according to the sixth embodiment of the present invention.

In the configuration of the sixth embodiment, components other than the long-sized lens are the same in the first embodiment. A long-sized lens_C used in the sixth embodiment is specified as follows:

R1=20 (mm)
R2=−3.8 (mm) (circular cone multiplier K=−0.484 on an elliptic surface)
center thickness: 10 (mm)
width of the main scanning direction: 50 (mm)
material: nd=1.491 and vd=57.2

In FIG. 23, a curved line G1 having a recession near a center in two curved lines shows the illumination distribution in the sub-scanning direction at the center of the main scanning direction. A curved line G2 having a peak near the center of the sub-scanning direction shows the illumination distribution in the sub-scanning direction at a right peak location of two peaks shown in FIG. 22.

Seventh Embodiment

Figure 24:
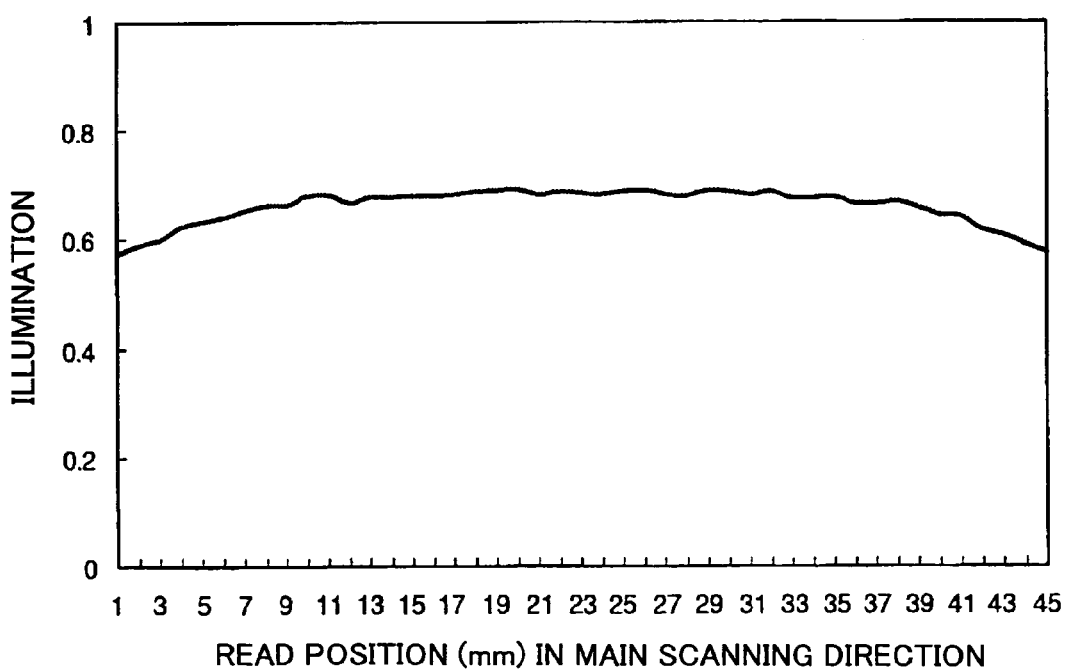
FIG. 24 is a diagram showing an illumination distribution in a main scanning direction of a surface to be illuminated in a configuration according to a seventh embodiment of the present invention.

FIG. 24 is a diagram showing an illumination distribution in a main scanning direction of a surface to be illuminated in a configuration according to a seventh embodiment of the present invention.

Figure 25:
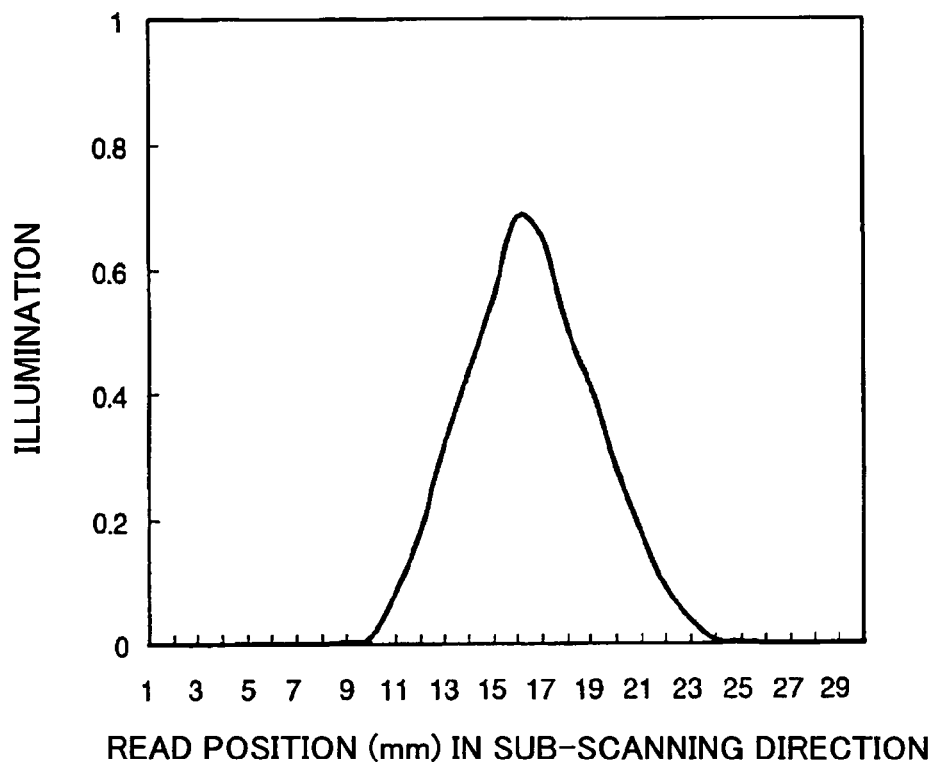
FIG. 25 is a diagram showing the illumination distribution in a sub-scanning direction of the surface to be illuminated in the configuration according to the seventh embodiment of the present invention.

FIG. 25 is a diagram showing the illumination distribution in a sub-scanning direction of the surface to be illuminated in the configuration according to the seventh embodiment of the present invention.

In the seventh embodiment, the long-sized lens_C shown in FIG. 23 is applied to the configuration shown in FIG. 3.

In a case of a single light source, as shown in FIG. 22, peak values being 1.5 times as much as the center appear near the both edges. By applying a plurality of light sources, as shown in FIG. 24, a plurality of peak values are connected, so as to be flat as a whole.

Figure 26:
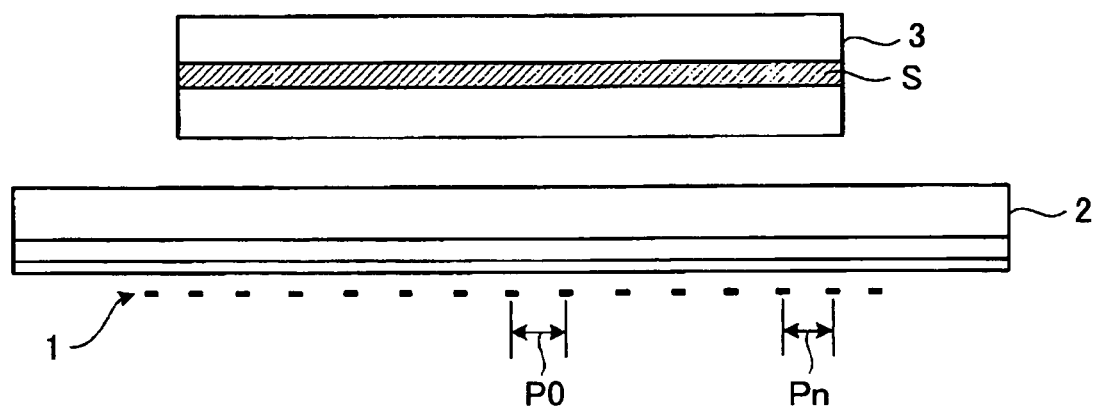
FIG. 26 is a diagram showing an example of an interval of light emitting element of a light source unit, according to the seventh embodiment of the present invention.

FIG. 26 is a diagram showing an example of an interval of light emitting element of a light source unit, according to the seventh embodiment of the present invention.

In FIG. 26, light emitting elements (P0, ..., Pn) are shown.

In each arrangement interval among a plurality of the light emitting elements, when an interval P0 denotes an interval between the light emitting elements nearest the center of the surface to be illuminated, each interval Pn (n≧1) is an interval from an arbitrary light emitting element to an light emitting element nearest an edge of the surface to be illuminated, and the following inequalities are simultaneously satisfied:

$P(n-1) \geq Pn$, and $0.2 \leq Pn/P0 \leq 1$.

In the illumination distribution shown in FIG. 24, it can be seen that the illumination is slightly deteriorated at both edges in the main scanning direction. This appears since each edge in the main scanning direction of the surface to be illuminated receives only luminous flux from a respective center side from a location of the edge. In order to eliminate this problem, the above-described configuration is applied.

Purposes of the above-described embodiments are to uniform the illumination of the surface to be illuminated. However, a peripheral light volume becomes insufficient, which is a so-called "shading", due to a characteristic of a read optical system. The configuration in the seventh embodiment can be used to realize a document lighting device concerning a shading correction. As described above, an arrangement density of the light emitting elements is set to be higher nearer edges of the main scanning direction, so that the peripheral light volume becomes greater than the center. As a result, a light volume through the read optical system becomes uniform.

An arrangement example to uniform the illumination distribution on the surface to be illuminated will be illustrated in detail.

A total number of the light emitting elements is 15, and the arrangement interval P0 of a light source nearest the center of the surface to be illuminated in the main scanning direction is 6.2 mm.

Toward each edge from a next light emitting element, the arrangement interval becomes narrower by 3 mm every one light emitting element until a second light emitting element, and each of other light emitting elements at an outer side of the second light emitting element consecutively becomes narrower by 0.4 mm. Accordingly, intervals between a light emitting element (seventh light emitting element) being an outer most and a light emitting element immediately inside the light emitting element (seventh light emitting element) becomes 4 mm. A distance between centers of light emitting elements located at an outer most side becomes 72.2 mm, which is longer than a length (45 mm) of the surface to be illuminated. Both edges of the main scanning direction for the surface to be illuminated receive the luminous flux from the light sources having higher arrangement density, and also receive the luminous flux from the center and from the outer side distanced from a center location. Therefore, it is possible to eliminate the deterioration of the peripheral illumination.

As described above, the length of the surface to be illuminated is 45 mm. In order to practically apply to the image reader, a quantity of the light emitting elements is increased so as to correspond to a desired width of the original.

Next, the light source applicable to the present invention will be described.

In the present invention, a light emitting diode (LED) is the most suitable light source. In order to read all originals, a white color LED is preferable to use.

There are various types for the white color LED. One of the types is a one-chip type white LED using a fluorescent material. A fluorescent part, which is called a chip, is sealed by a transparent sealing member mixing a YAG fluorescent material. This chip emits blue color configured by InGaN. Therefore, when the chip emits blue color, the fluorescent material is excited simultaneously. Since blue color and yellow color are complementary colors for each other, a combination of the both colors is recognized as a while color light when the both colors are emitted with together.

There is a white color light emitting diode as another type, in which instead of using the fluorescent material, while color is emitted by emitting a mixed color using more than two chips being of different colors. A plurality of chips are arranged on the same surface, and white color is recognized when all emitted colors are mixed.

For example, in a case of using two chips, as described above, one chip emitting blue color and another chip emitting yellow color are used. In a case of three chips, chips emitting read, green, and blue colors corresponding to the three primary colors are used.

Figure 27:
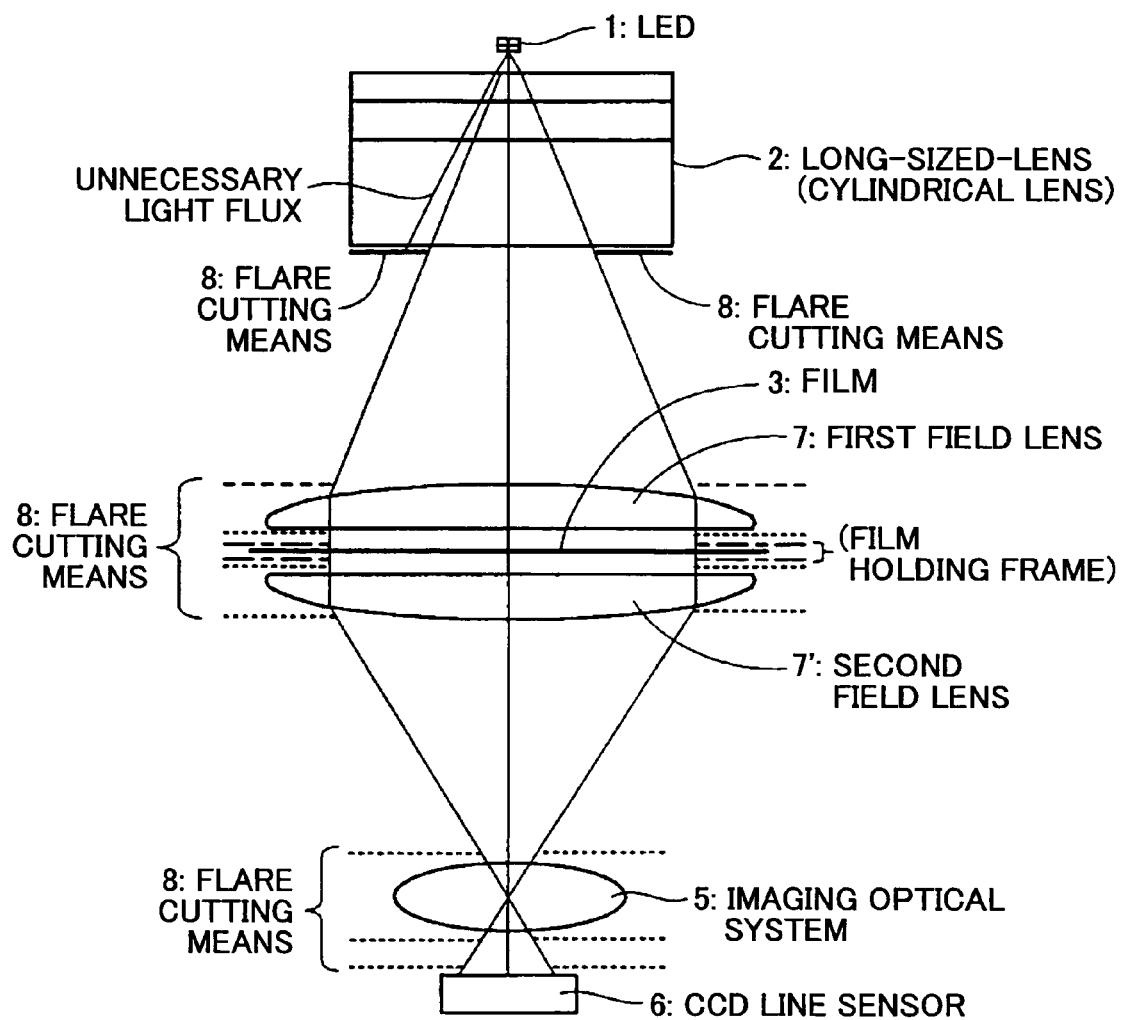
FIG. 27 is a diagram for explaining a translucent document reader according to an eight embodiment of the present invention.

FIG. 27 is a diagram for explaining a translucent document reader according to the eight embodiment of the present invention.

In FIG. 27, an imaging optical system 5, a CCD (Charge Coupled Devices) line sensor as an image pickup devices, a first field lens 7, a second field lens 7', and a plurality of flare cutting means 8 are shown.

Figure 1:
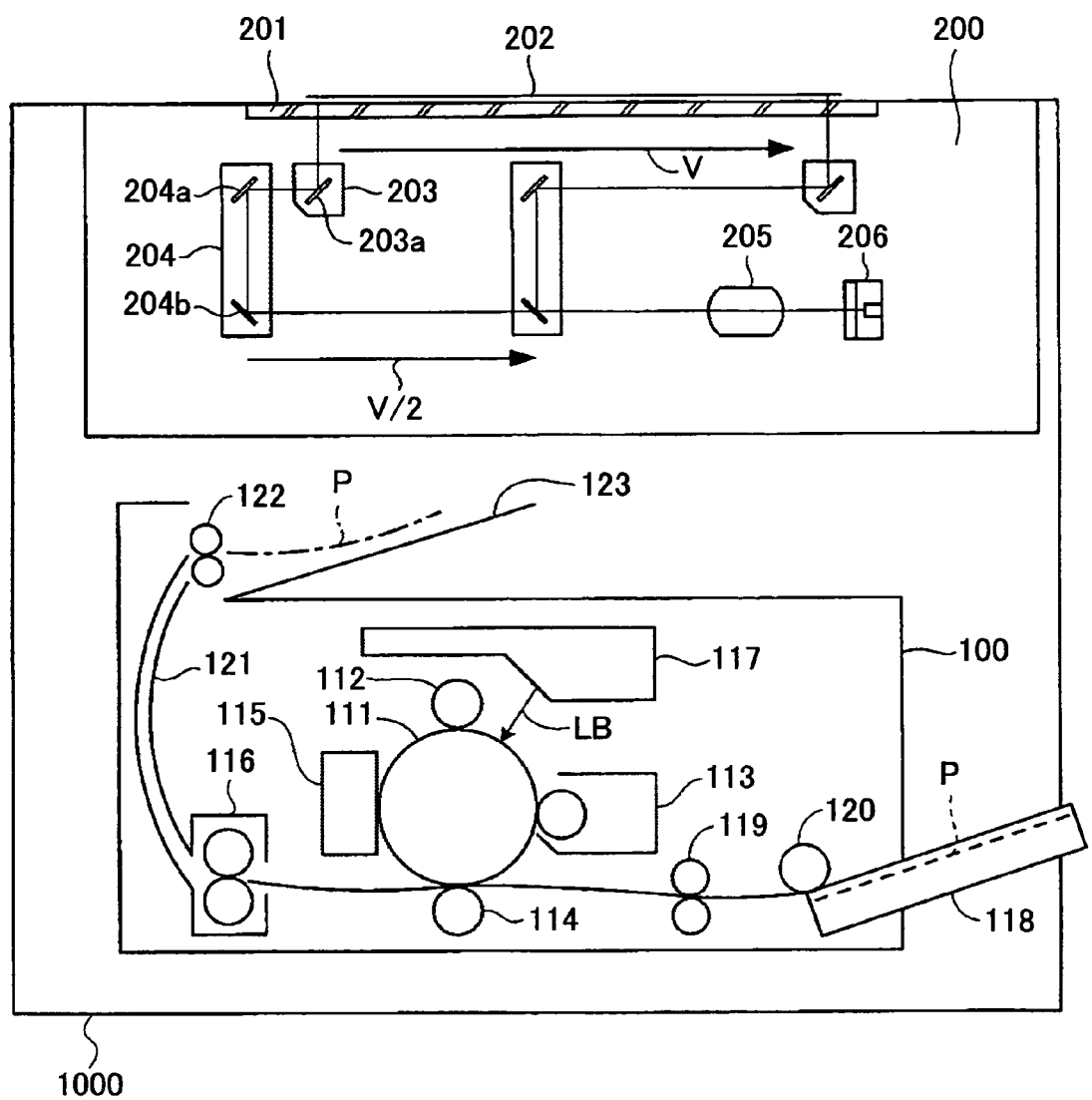
FIG. 1 is a schematic diagram showing an image forming device including image reader.

The above explanations are based on the image forming device shown in FIG. 1. As described in the Field of the Invention in this specification, the present invention is applied to a digital laboratory.

In general, in the image forming device, an original being a sheet or a book is used and is read with a reflected light. A transparent original for an OHP (Over Head Projector) may be copied. In this case, a white light reflector is generally placed on a back surface of the original.

On the contrary, the digital laboratory generally reads the original being a transparent film by using a translucent method.

FIG. 27 shows a cross-sectional view showing a translucent document reader. In FIG. 27, the luminous flux emitted from the LED 1 passes through the long-sized lens 2, and reaches to a film 3 as a surface of the original. For example, as the film 3, a photograph film such as a negative color film is mainly used, so that a color image can be obtained by using transmitted light.

The luminous flux transmitted through the film 3 enters the CCD sensor 6 as the image pickup device and is recorded as image data in the end, or is transferred to other parts. The image pickup device is not limited to the CCD sensor 6, but any device known as a line sensor can be used.

In order to properly read an image, in general, a lens, which is called a field lens and have the same positive power in both the main scanning direction and the sub-scanning direction, is placed in front of the film 3. At least, the field lens may cover a length of the main scanning direction, and may have a size to cover a read width in the sub-scanning direction if including an optical axis.

The luminous flux arriving at the first field lens 7 receives an action so as to be a parallel luminous flux being perpendicular to a surface of the film 3.

The parallel luminous flux transmitted through the film 3 enters to the second field lens 7'. This parallel flux receives an action so as to converge to a center of an entrance pupil of the imaging optical system 5. The luminous flux transmitted through the imaging optical system 5 becomes a divergent bundle of rays, and enters to the CCD line sensor 6, so as to read in the main scanning direction.

It may be possible to design the field lenses 7 and 7' to be equal to each other. However, basically, it is not necessary to do so.

The imaging optical system 5 is set so that the film 3 and the CCD line sensor 6 have a conjugate relationship with each other.

In general, optical axes of the first field lens 7 and the second field lens 7' and the imaging optical system 5 are corresponded to each other. Moreover, the LED 1 is arranged on the optical axes. Furthermore, a center of the CCD sensor 6 is placed on the same axes.

Not shown, but the film 3 has a portion to be illuminated (for convenience, called a valid portion) and a portion not to be illuminated (for convenience, called an invalid portion). In general, in a case of using a negative film, a transmission light volume of the invalid portion is greater. If the transmission light volume is allowed to enter to the first field lens 7 and the second field lens 7', and the imaging optical system 5, the transmission light volume becomes stray light (so-called flare light), and overlaps on a desired image. In order to eliminate this problem, a flare cutting means 8 is provided on an emitting surface of the long-sized lens (cylindrical lens) 2 to cut the luminous flux (called an unnecessary light flux) directing to the invalid portion. That is, the flare cutting means 8 is arranged so as to cut the unnecessary light flux as much as possible without cutting the luminous flux (called valid luminous flux) of the valid portion even if an arrangement error or a like is caused in vicinities of both edges of the longitudinal direction (main scanning direction) of the long-sized lens 2.

In a viewpoint of leading the valid luminous flux toward a valid area of the CCD line sensor 6, there is no difference in principle in a case in that the flare cutting means 8 is provided to any of anterior and posterior surfaces of the first field lens 7, anterior and posterior surfaces of the film 3, anterior and posterior surfaces of the second field lens 7', anterior and posterior surfaces of the imaging optical system 5, and anterior and posterior surfaces of the CCD sensor 6 (shown by broken lines, dash-dotted lines, and dotted lines, respectively). However, a great difference appears when considered an occurrence of the flare light. In a case of considering an accuracy, the flare cutting means 8 is provided at a place having greater luminous flux, that is, at a range from the anterior surface of the first field lens 7 to the posterior surface of the second field lens 7'. However, the flare light is relatively caused by diffused reflection within the long-sized lens 2. Accordingly, the flare cutting means 8 is preferably provided at a location before the flare light enters the first field lens 7, that is, at the anterior surface of the first field lens 7 (shown by the broken lines in FIG. 27). It is not limited to provide the flare cutting means 8 at any one of the above-described locations, but the flare cutting means 8 is provided to a plurality of locations, so as to further improve a light cutting effect.

At each of the above-described locations, the flare cutting means 8 is arranged so as to greatly cut the unnecessary light flux as much as possible without cutting the valid luminous flux even if the arrangement error is caused.

As the flare cutting means 8, in a case of arranging on the long-sized lens 2, a plate member may be arranged. Alternatively, an obscure member having flexibility may be attached on the emitting surface (curved surface in the sub-scanning direction) of the long-sized lens, or an obscure member having a light blocking effect may be coated with on the emitting surface of the long-sized lens. The similar manner can be conducted to the first field lens 7 and the second field lens 7'.

In a case of arranging the flare cutting means 8 at a location of the film 3, for example, a film holding frame (not shown but indicated by the dash-dotted line in FIG. 27) for holding the film 3 is provided to function as a mask, so as to shield the unnecessary light flux.

It is not preferable to arrange the flare cutting means 8 on the anterior and posterior surfaces of the imaging optical system 5 or immediately before the CCD line sensor 6, since the luminous flux is small and the flare has already occurred due to the first field lens 7 and the second field lens 7' and the like. Also, it is not preferable to arrange the flare cutting means 8 on the posterior surface of the second field lens 7', since the flare has already occurred.

Eighth Embodiment

A specification in an eighth embodiment will be shown as follows:
R1=10 mm
R2=−2.88 (circular cone multiplier K=−0.837 on an elliptic surface)
 center thickness: 7.2 mm
 width in main scanning direction: 15 mm
 material: LED having nd=1.491 and vd=57.2
 flux distribution: Lambert distribution
 intensity distribution on emission surface: uniform
 emission surface size: 1 mm×1 mm
 quantity: one
 luminous efficiency: 1 (W)

contact glass
: center thickness: 3.2 (mm)
: material: LED having nd=1.517 and id=64.2
location relationship
: interval between LED and R1 of long-sized lens: 1 mm
: interval between R2 of long-sized lens and film surface: 13 mm
size of surface to be illuminated
: 24 mm (main scanning direction)×36 mm (sub-scanning direction)

In the above configuration, a size of the flare cutting means 8 is defined so as to cut the luminous flux at 24 mm distance above the surface to be illuminated.

Figure 28:
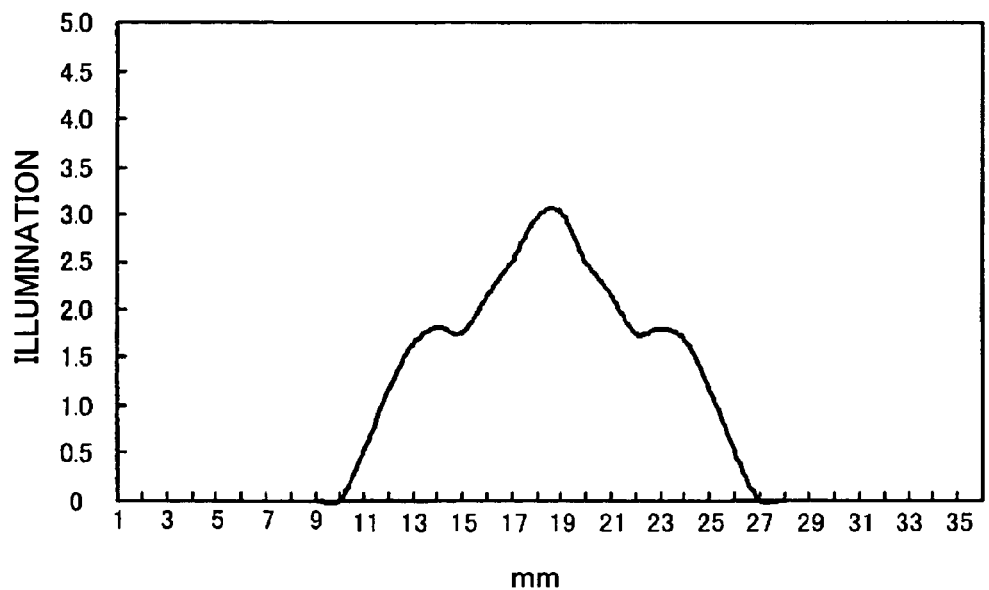
FIG. 28 is a diagram showing an illumination distribution in a sub-scanning direction according to the eighth embodiment of the present invention.
Figure 29:
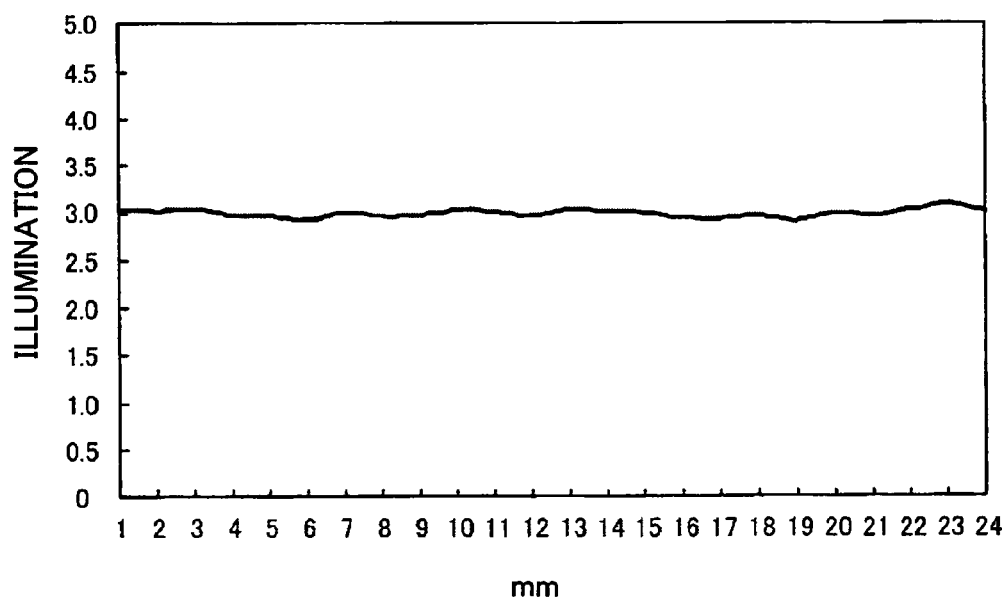
FIG. 29 is a diagram showing the illumination distribution in a main scanning direction according to the eighth embodiment of the present invention.

The illumination distribution in the eighth embodiment will be described with reference to FIG. 28 and FIG. 29. FIG. 28 is a diagram showing the illumination distribution in the sub-scanning direction according to the eighth embodiment of the present invention. FIG. 29 is a diagram showing the illumination distribution in the main scanning direction according to the eighth embodiment of the present invention.

These illumination distributions are obtained in that a valid region of the surface to be illuminated is divided into 1 mm meshes in both main scanning direction and the sub-scanning direction, one million rays are traced, and the illumination is decided based on a quantity of incident rays for each mesh. FIG. 28 shows the illumination distribution in the sub-scanning direction on the cross section in the sub-scanning direction including the light sources. FIG. 29 shows the illumination distribution on the main scanning cross section, at which peak values appear as shown in FIG. 28. It can be seen that the illumination in the main scanning direction barely shows the non-uniformity.

According to the present invention, in the document lighting device, the convergent point of the luminous flux is located on the surface to be illuminated at a main scanning location distanced from the cross section in the sub-scanning direction at a light source location. Therefore, it is possible to obtain an illumination distribution being approximately uniform in a read area in the main scanning direction.

In the second aspect of the invention, the document lighting device including a light source unit arraying a plurality of LEDs having a predetermined flux distribution, in which a long-sized lens, which does not converge, is properly arranged in the sub-scanning direction, each LED converges onto a surface location of an original having an angle in the main scanning direction with respect to a cross section in the sub-scanning direction, instead of the surface location of the original on a cross section in the sub-scanning direction of each LED. Therefore, it is possible to realize higher convergence of light and brighter NA in the sub-scanning direction, to suppress loss caused by light diffusion, and to realize less non-uniformity of the illumination even if relatively less amount of LEDs are used.

[Second Aspect of the Invention]

In the following, another aspect of the present invention will be described.

Figure 30:
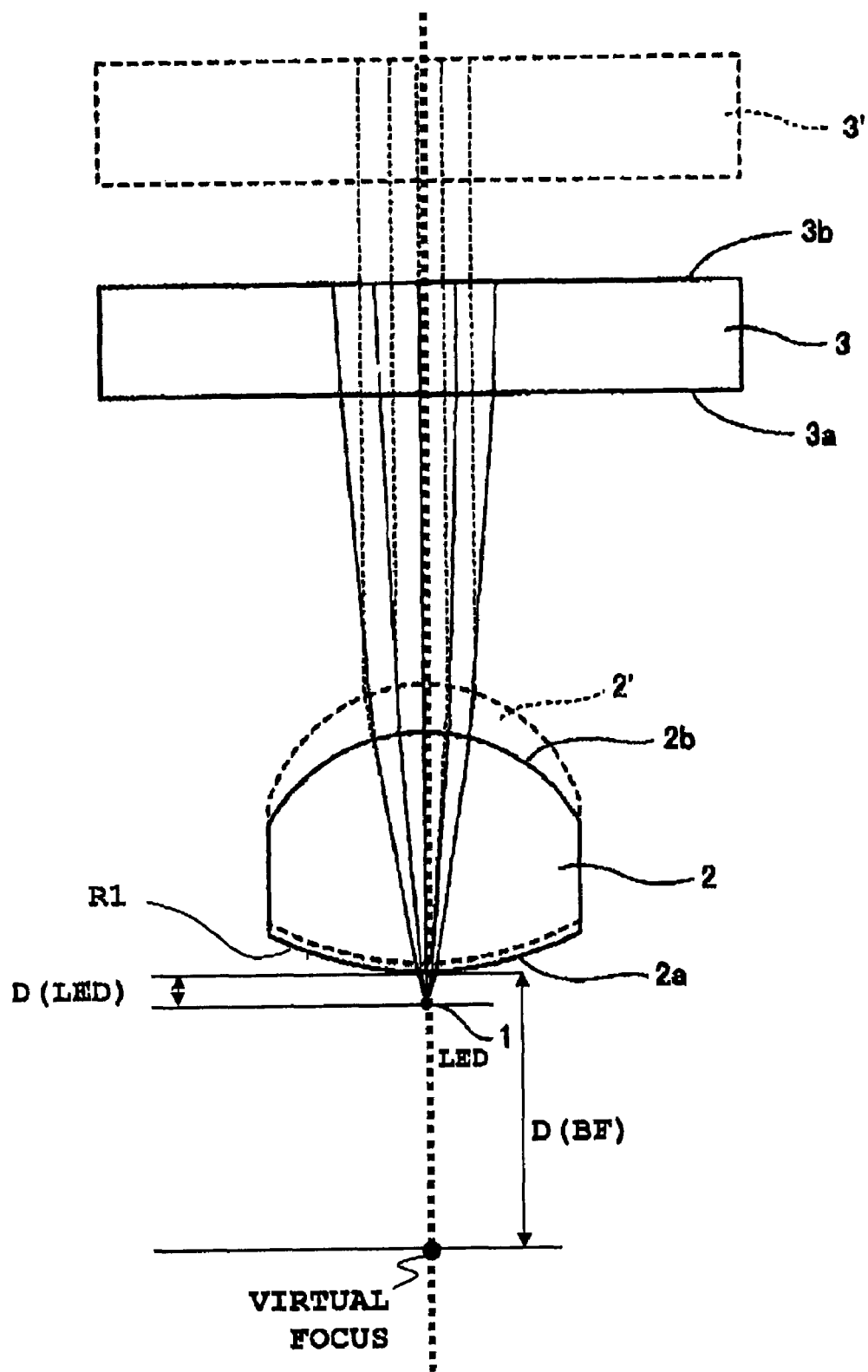
FIG. 30 is a longitudinal sectional view for explaining an action of a long-sized lens according to the present invention.
Figure 31:
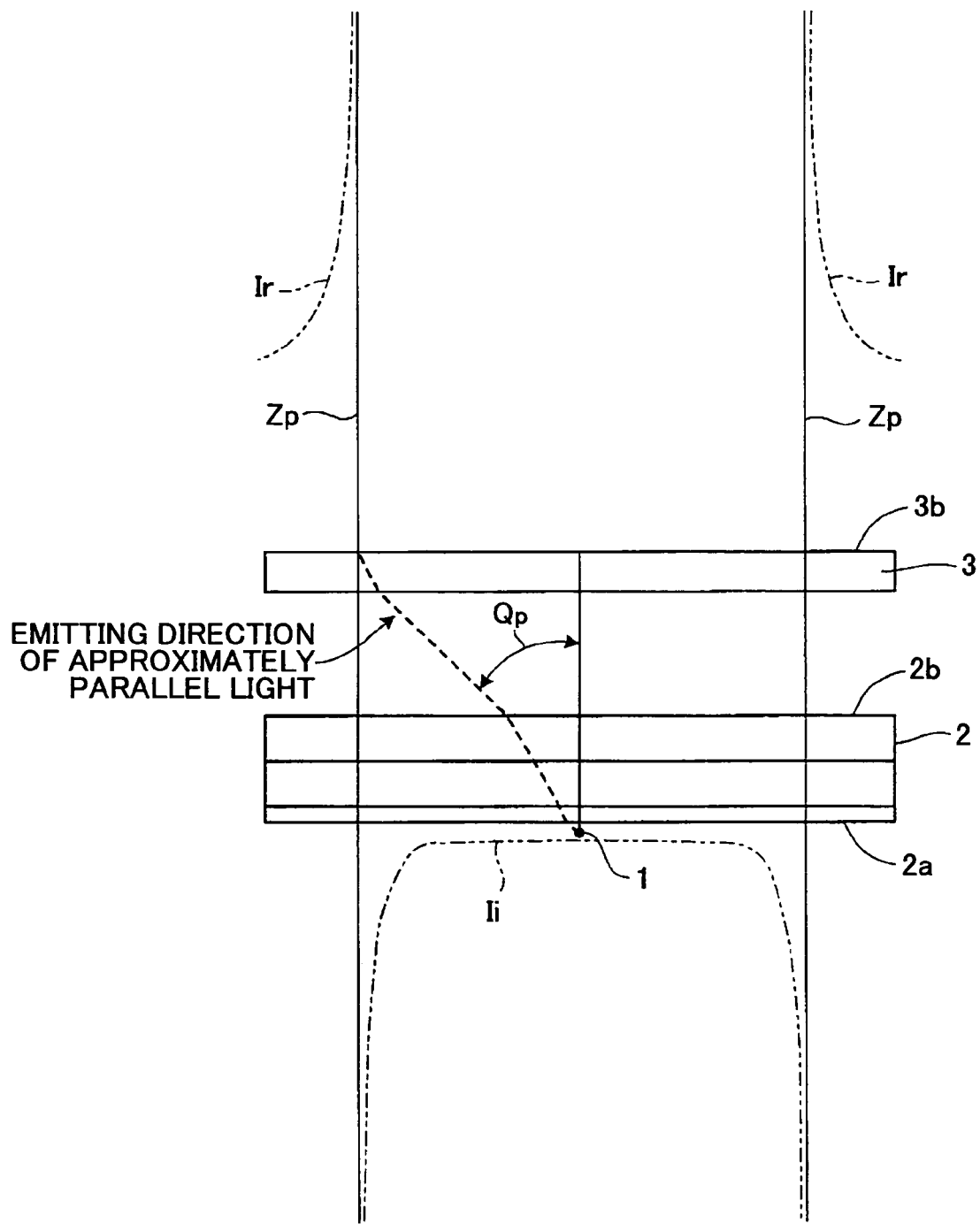
FIG. 31 is a cross-sectional view for explaining the action of the long-sized lens according to the present invention.

An action of a long-sized lens according to the present invention will be described with reference to FIG. 30 and FIG. 31. FIG. 30 is a longitudinal sectional view for explaining the action of a long-sized lens according to the present invention. FIG. 31 is a cross-sectional view for explaining the action of the long-sized lens according to the present invention.

In FIG. 30, a point surface 1, a long-sized lens 2 as a cylindrical lens, and a contact lens 3 placed in front of a surface 3a to be illuminated are shown.

An incident surface 2a of the long-sized lens 2 is arranged in a vicinity of a light emitting surface of the point source 1, and the surface 3a to be illuminated is arranged at a location depart a predetermined distance from the light emitting surface 2b of the long-sized lens 2. The surface 3a to be illuminated is set to correspond to a surface 3b of the contact glass 3 (hereinafter, called a rear surface) at an opposite surface to the point source.

For example, the point source 1 has a sufficiently small luminous point such as LED. In a case of considering an A4 size as the surface 3' to be illuminated, a size of the luminous point is recognized as a dot as compared with a sheet width.

The long-sized lens 2, as it called, is long in one direction as shown in FIG. 31, and a cross-sectional surface orthogonal to a longitudinal direction has the same lens shape at all locations in principle. Even in a case in that a lens is not straight in the longitudinal direction and a shape of the cross sectional surface is changed at any location, the lens is included in long-sized lenses. Regardless of a detailed lens shape, this long-sized lens having this formation is called cylinder lens or cylindrical lens. Hereinafter, simply called a lens or a cylindrical lens.

This document lighting device is used for a digital copier and an image scanner. In this case, one direction of an original is corresponded to the longitudinal direction of the long-sized lens 2 and the original is place upon the rear surface 3b of the contact glass. Since an illumination light condenses along lines with the longitudinal direction, the entire surface of the original cannot simultaneously read out. Accordingly, the surface of the original and the document lighting device relatively move toward opposite directions on the original. In this case, a line direction of the illumination light is called main scanning direction, and the above-described relative movement direction is called sub-scanning direction. FIG. 30 shows the scanning cross section. If the cross section in the sub-scanning direction is simply described, there are cross sections in the sub-scanning direction innumerably. In the present invention, the cross section in the sub-scanning direction is a cross section in the sub-scanning direction including a light source.

In the present invention, in the cross section in the sub-scanning direction, an outgoing light of the LED is collimated and illuminates an original surface.

However, in FIG. 31, a luminous flux emitting toward a direction shown by a broken line does not become a parallel luminous flux after the luminous flux is emitted from the long-sized lens 2. The luminous flux rather becomes a convergent luminous flux.

A lens 2', a contact glass 3', and light flux shown by a broken line in FIG. 30 shows a state of a cross-section along with a broken line shown in FIG. 31. This phenomenon is due to curvatures of an apparent incident surface and an apparent emitting surface with respect to the luminous flux become larger and a distance between the incident surface and the emitting surface becomes longer, since the luminous flux diagonally traverses with respect to the long-sized lens 2.

An angle θp in FIG. 31 is shown as an angle where the light flux becomes parallel just on the surface 3a to be illuminated. For the sake of convenience, this angle θp is called a non-focal point angle. Hereinafter, in general, an angle θ denotes an angle between the luminous flux emitting a cross section perpendicular to the original and the cross section in the sub-scanning direction. This angle θ is called bias luminous flux.

According to the above configuration, not all the light flux emitted from the point source 1 become a divergent bundle of rays, and there is light flux that becomes parallel on a surface of the original. A change of a focal point location in the main scanning direction is briefly shown by a double dash-dotted in FIG. 31.

As the angle θ of the bias light flux emitted from the point source 1 becomes greater, an image Ii being originally a virtual image becomes further gradually and finally becomes infinity at the angle θp. This is a reason that the angle θp is called the non-focal point angle. When the angle θ is greater than the non-focal point angle θp, the image Ii becomes a real image Ir while approaching the contact glass 3 from infinity at an opposite side. A line Zp is an asymptotic line of the imaged Ii and Ir.

Figure 32:
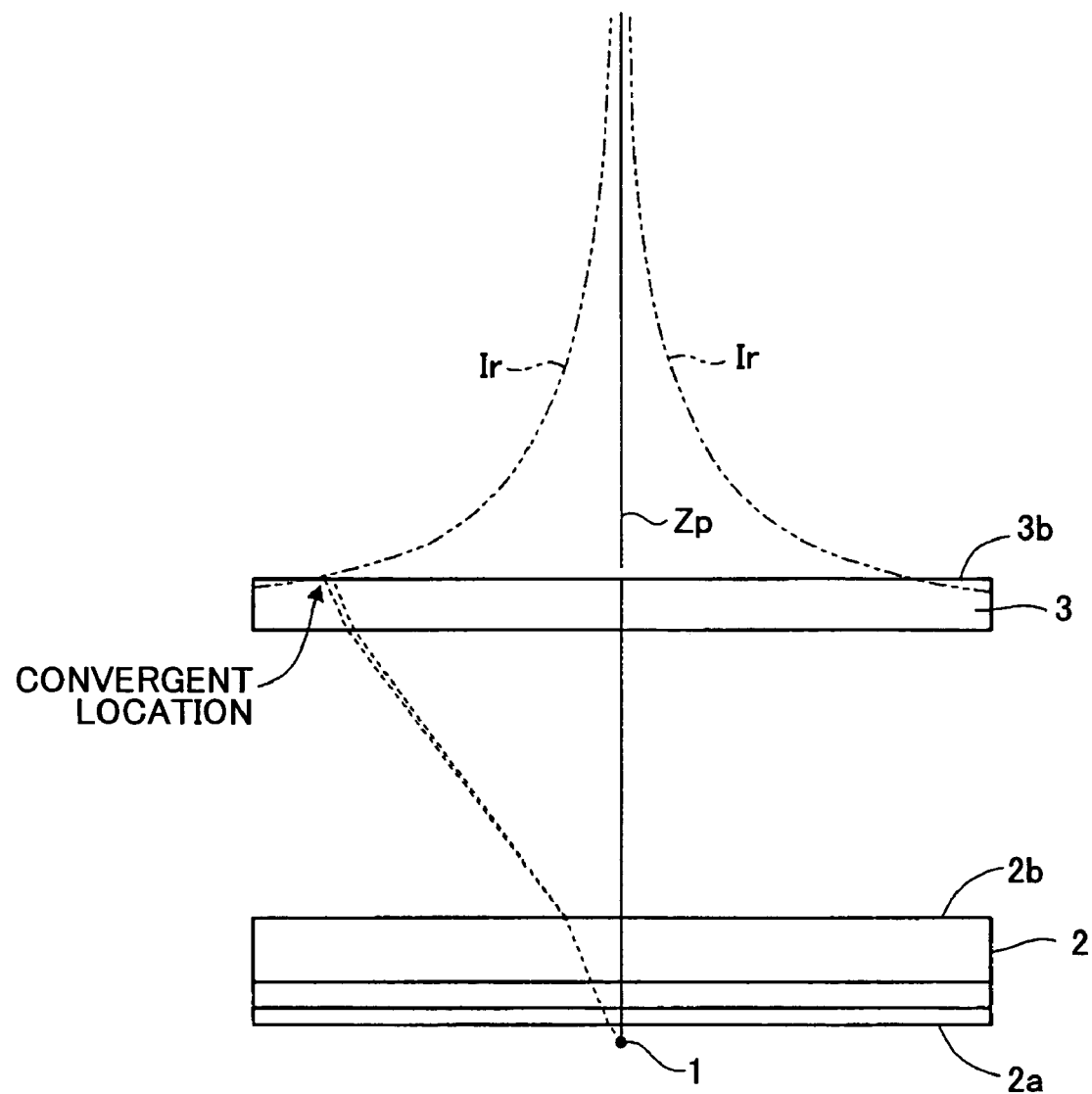
FIG. 32 is a diagram for explaining a configuration in a second aspect of the invention.

FIG. 32 is a diagram for explaining the configuration in a second aspect of the invention.

In the configuration of the second aspect of the invention, the light flux becomes parallel when the bias angle θ is set to be zero. And an angle around the angle θp is called the convergent angle θf, and the light flux is set to converge at the angle θf. That is, an image of the light source becomes infinity on the cross section in the sub-scanning direction including the light source. As the bias angle θ further becomes greater, the image I approaches the contact glass 3 as the real image Ir along with approximately the asymptotic line Zp, and arrives on the rear surface 3b of the contact glass 3 at the convergent angle θf. As the bais angle θ further becomes greater, the real image Ir enters inside the contact glass 3.

However, since energy tends to be strongly concentrated at a convergent point of the light flux, it is not easy to obtain a flat illumination distribution in the main scanning direction. Two methods can be applied in order to solve this problem. That is, one method is a method having the convergent point in the main scanning direction not to enter the valid area. This is a reason that the configuration shown in FIG. 30 and FIG. 31 is applied in the second aspect of the invention. In another method, a magnification of an image at the light source is set to be greater so that the energy is not concentrated in a narrow area. The another method will be described in embodiments described later. Alternatively, it can be considered that larger light emitting element is applied. However, in a case of using a market product as a light source, it is effective to prepare a LED having a special larger emission surface.

Figure 33:
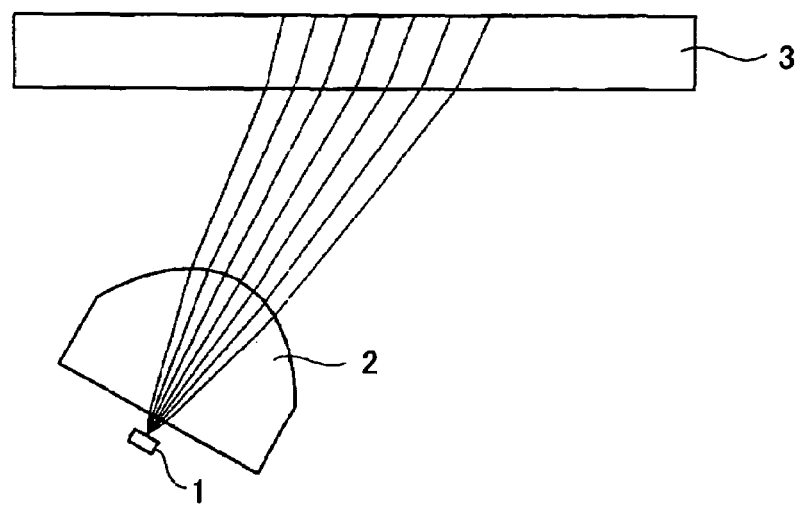
FIG. 33 is a diagram showing a configuration concerning a practical use sate.

FIG. 33 is a diagram showing a configuration concerning a practical use sate.

In FIG. 33, only the cross section in the sub-scanning direction including a light source is shown. Since it is necessary for a scanning optical system to optically read the surface to be illuminated, the surface is obliquely illuminated and is read from a front view. This configuration is also applied in a ninth embodiment described later.

Figure 34:
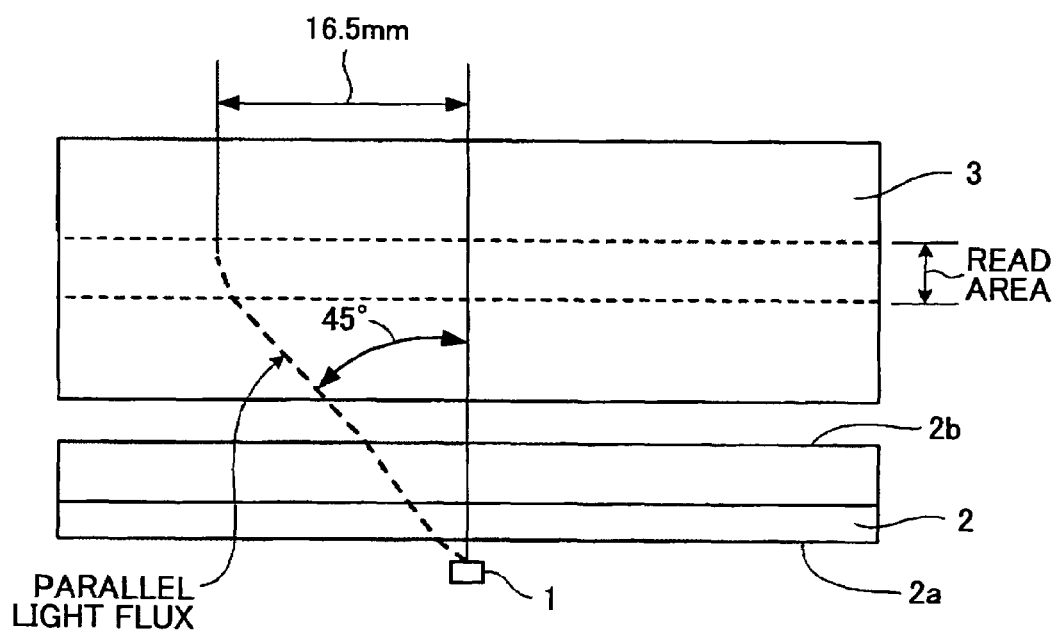
FIG. 34 is a schematic view showing a cross-section along with a light path including a main luminous ray.

FIG. 34 is a schematic view showing a cross-section along with a light path including a main luminous ray.

In FIG. 34, a view of the surface to be illuminated is replaced with a front view. Hereinafter, for the sake of convenience, this view shown in FIG. 34 is called an anomalistic plan view. FIG. 34 also shows a basic configuration of the ninth embodiment.

The light flux on the cross section in the sub-scanning direction enters as a divergent light flux with respect to the surface to be illuminated, and enters the surface to be illuminated as a parallel light flux at the angle θp=45°.

For example, the contact glass 3 is made up of a glass board having a 20 mm width and a 50 mm length, and approximately 2 mm width at a center of the contact glass 3 is used as a read area. A width of the CCD sensor 6 as an image reading part in the sub-scanning direction is approximately 1 mm by converting into a location of the surface to be illuminated in a case of a CCD for three colors. The read area is 2 mm in that an illumination width has a margin, so that a manufacture error of a component, an assemble error, and a like are considered. Accordingly, if the read area is included in an allowable range of the non-uniformity of the illumination, it is possible to obtain a higher quality of an image. The non-uniformity of the illumination is indicated by a percentage showing a ratio to a maximum illumination, and an allowable value of the non-uniformity is preferably set to be less than or equal to 12% in a case of reading a color image. The allowable value is set to be approximately 30% in a case of reading a black and white image.

The main luminous ray is a luminous ray passing through an optical axis of the long-sized lens 2. In general, a radiation direction of a maximum radiation energy of the light source is corresponded to the optical axis of the long-sized lens 2.

Figure 35:
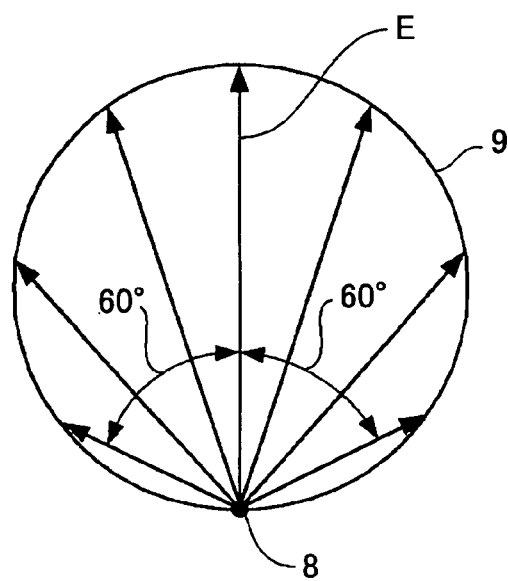
FIG. 35 is a diagram showing a flux distribution of the point source being the Lambert distribution.

FIG. 35 is a diagram showing a flux distribution of the point source being the Lambert distribution.

In FIG. 35, a point source 8 and a flux distribution 9 are shown.

An intensity distribution of a light energy emitted from the point source 8 having a spherical shape Q is called the Lambert distribution. A distribution in FIG. 35 shows a cross-sectional view. In a case of this distribution, a maximum energy radiation is conducted in a normal direction facing the light source. A radiation direction of a maximum energy E is defined as an angle θ=0°. As the angle θ becomes wider, a light energy of the luminous flux is reduced, and the energy is reduced to be half the maximum energy E (half value) at an angle θh=60°. Then, the energy becomes one-quarter the maximum value. The angle θh=60° is called half-value angle of this distribution. Almost all of the radiation energy is radiated within the half-value angle.

Ninth Embodiment

A specification of a ninth embodiment will be described as follows:
cylindrical lens
R1=∞
R2=−4.3 (circular cone multiplier K=−0.467 on an elliptic surface)
center thickness: 7.2 (mm)
width of main scanning direction: 100 (mm)
material: nd=1.491 and vd=57.2
LED
flux distribution: Lambert distribution
intensity distribution on emission surface: uniform
emission surface size: 1 (mm)×1 (mm)
quantity: nine, 10 (mm) pitch
efficiency: 1 (w)×9
contact glass
center thickness: 3.2 (mm)
material: nd=1.517 and id=64.2
location relationship
D (LED): 1 (mm)
D (BF): 3.93 (mm)
distance between surface R2 of cylindrical lens and contact glass: 10 (mm)
inclination of contact glass with respect to optical axis of cylindrical lens: 30 degrees
surface (surface of original) to be illuminated: surface of contact glass, 20 mm width and 50 mm length However, D (BF) is defined based on another specification.

Figure 36:
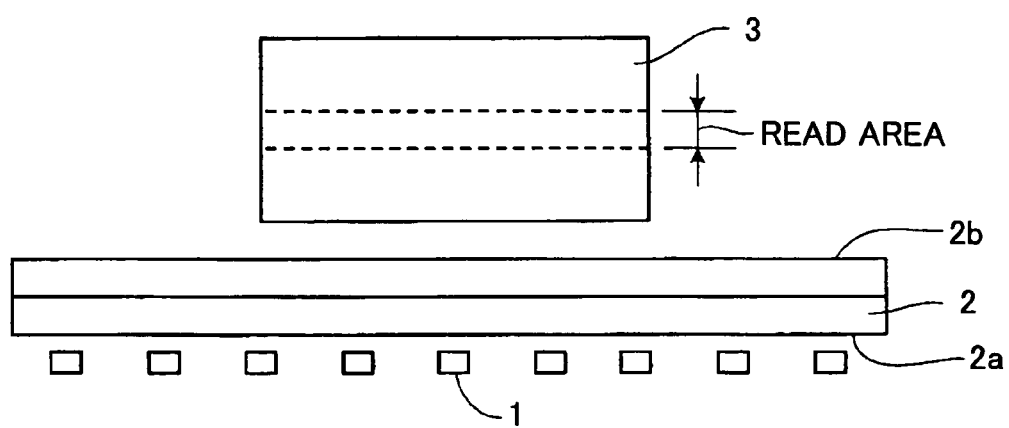
FIG. 36 is an anomalistic plan view showing a configuration according to a ninth embodiment of the present invention.

FIG. 36 is an anomalistic plan view showing a configuration according to the ninth embodiment of the present invention.

In the ninth embodiment, the non-focal point angle θp is set to be 45°. That is, a luminous ray emitted in a direction of the angle θp=45° with respect to a cross section in the sub-scanning direction from each LED becomes a parallel light after the luminous ray emits from the lens, and is set to pass through the rear face 3b of the contact glass 3, which is the surface to be illuminated, while the luminous ray remains the parallel light. A reason of the angle θp=45° considers a relationship with the half-value angle θh of the flux distribution of the light emitting element. Since the half-value angle θh=60° in the Lambert distribution, if the angle θp is set to be more than 45°, the illumination is significantly deteriorated in the main scanning area having a greater angle than the angle θp. Since other conditions are involved in determining a degree of the relationship between the angle θp and the angle θh, the relationship cannot be uniquely determined. However, at least, it is needed to satisfy θp≦θh.

Figure 37:
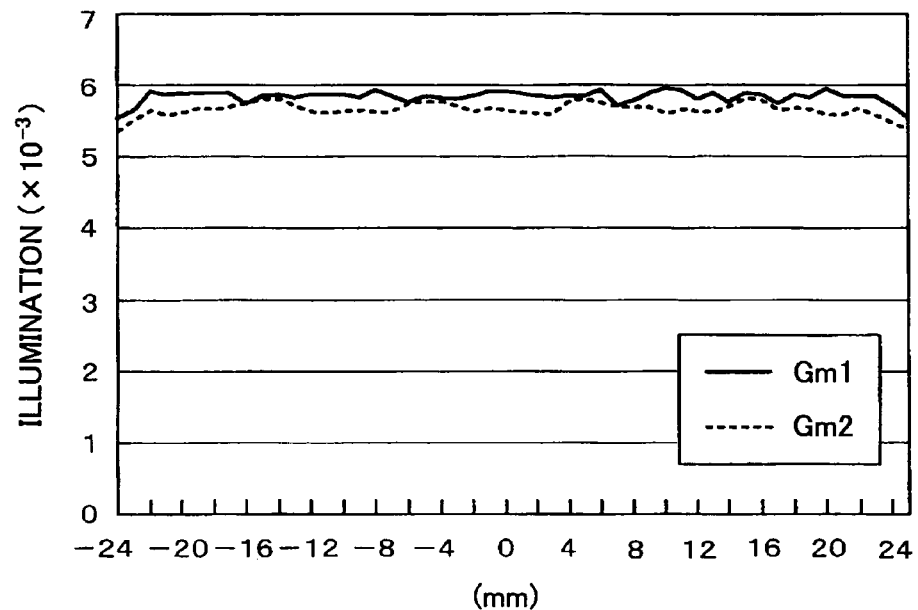
FIG. 37 is a diagram for explaining an illumination distribution according to the ninth embodiment of the present invention.

FIG. 37 is a diagram for explaining an illumination distribution according to the ninth embodiment of the present invention.

In FIG. 37, the flux distribution is considered, and the illumination is defined by a quantity of luminous rays entering each of areas, which are obtained by dividing a front surface of the contact glass 3 into 1 mm square meshes.

A center area of the illumination is defined by selecting the highest illumination at average in a view toward the main scanning direction at an approximately center of the illumination width. The illumination distribution in the main scanning direction is shown by curved lines Gm1 and Gm2. Each of the curved lines Gm1 and Gm2 represents a 1 mm width in the sub-scanning direction. Accordingly, a state of the illumination on the 2 mm width of the read area by these two curved lines Gm1 and Gm2.

Figure 38:
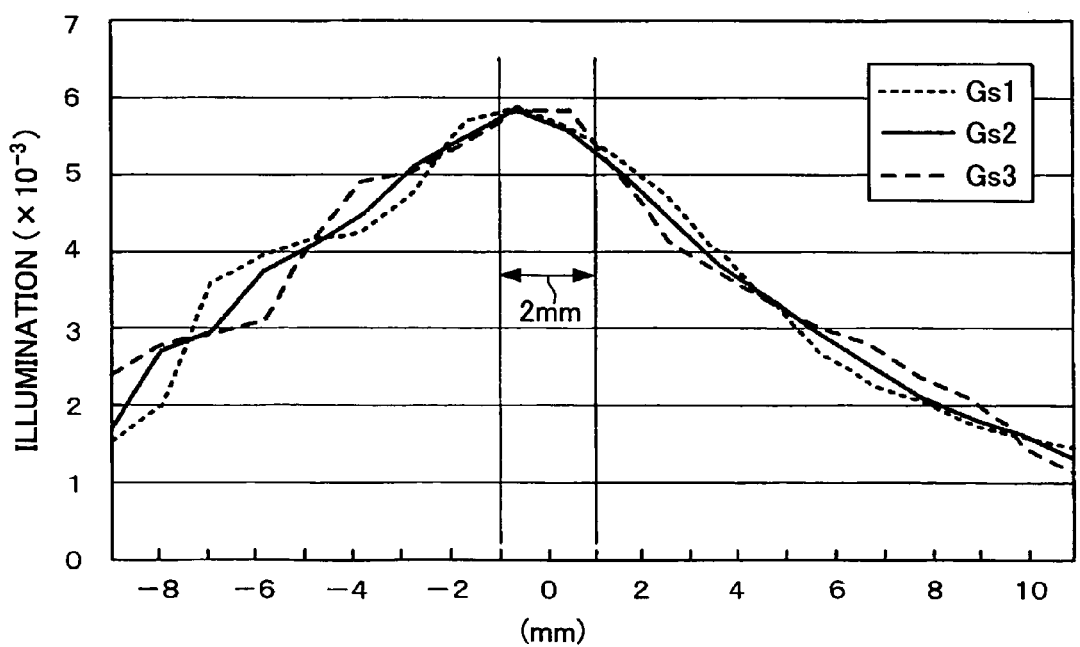
FIG. 38 is a diagram for explaining an illumination distribution in a sub-scanning direction according to the ninth embodiment of the present invention.

FIG. 38 is a diagram for explaining an illumination distribution in the sub-scanning direction according to the ninth embodiment of the present invention.

An illumination distribution in the sub-scanning direction at a center location of the main scanning direction is shown by a curved line Gs1. A curved line Gs2 shows an illumination distribution at a location of a 3 mm distance from the center location toward an edge of the main scanning direction, and a curved line Gs3 shows an illumination distribution at a location of a further 2 mm distance from the location for the curved line Gs2 (5 mm distance from the center location). Since an arrangement pitch of the LED is a 10 mm interval, approximately the same illumination distribution repeats at 10 mm intervals. Accordingly, at locations following to the location of the 5 mm distance, this graph is replaced in reverse, and repeated. Consequently, if the illumination distribution in a range from zero to 5 mm in the main scanning direction is confirmed, the illumination distribution can be assumed almost entirely. In this case, it is assumed that the illumination distribution from one edge to another edge is stable. The non-uniformity of the illumination in a range of the 5 mm width is less than 10%. In this graph, it can be seen that a range of the 2 mm width including a maximum value approximately at the center can be used as the read area.

Figure 39:
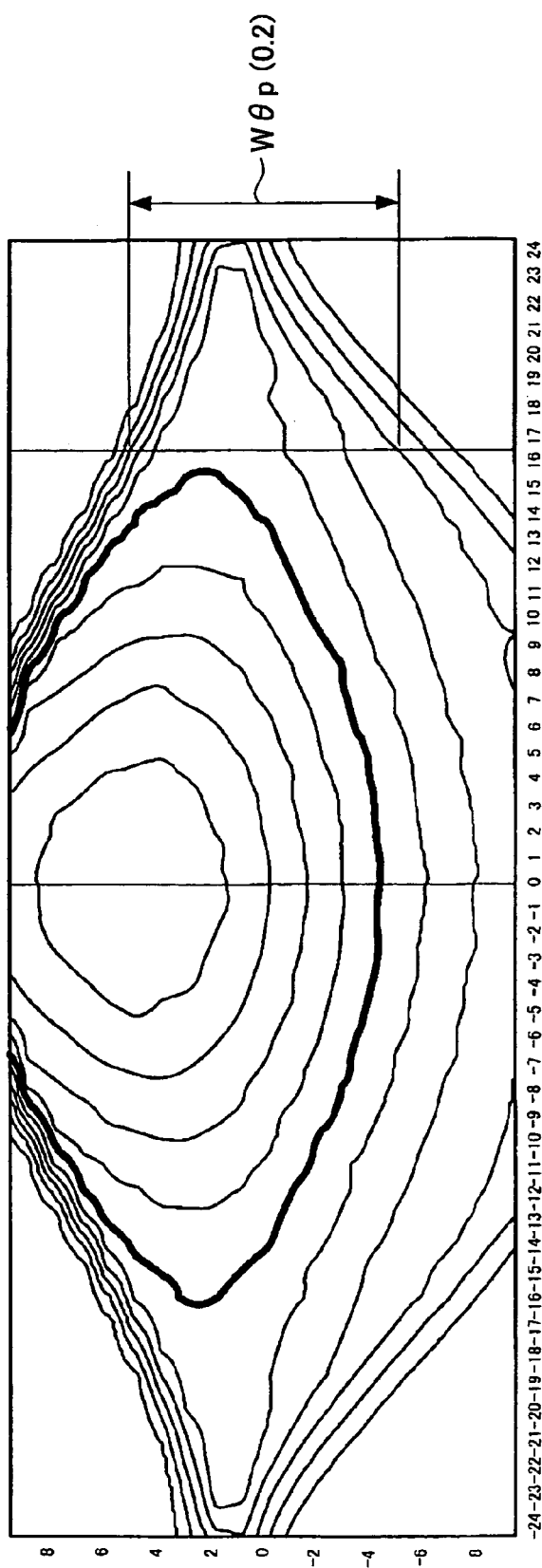
FIG. 39 is a diagram showing the illumination distribution in one read area, according to the ninth embodiment of the present invention.

FIG. 39 is a diagram showing the illumination distribution in one read area, according to the ninth embodiment of the present invention.

In FIG. 39, in a case of arranging one LED in the center in the main scanning direction, a relative illumination distribution on the surface to be illuminated is shown. The highest illumination is set to be "1", no illumination is set to be "0" (zero), and the illumination is equally divided. And the illumination is represented in contour by a unit of an illumination ratio 0.1. A heavy line shows a contour of an illumination ratio 0.5. An abscissa axis (x-coordinate) is a coordinate of the main scanning direction where the light source location is set at x=0. An ordinate axis (y-coordinate) is a coordinate of the sub-scanning direction where a center in a width direction of the contact glass 3 is set at y=0.

Referring to FIG. 39, a difference of an illumination width by the singe LED in the main direction can be seen well. The illumination width is defined as a width viewed in the sub-scanning direction in an area by an indicated contour line. In order to show the indicated contour line, the illumination ratio is displayed with % and is shown before the illumination width. For example, a 50% illumination width at a location (x=0) of the surface to be illuminated corresponding to a location of the light source is cut off at one edge of the contact glass 3 and is 14 mm. On the contrary, a 20% illumination width is cut off at both edges of the contact glass 3 and is 20 mm. In this case, a 10% illumination width is also the same 20 mm.

In order to see the illumination width corresponding to the non-focal point angle θp, a contour line in the sub-scanning direction at a location of x=16.5 mm is referred to. At this location, since there is no heavy line which is previously shown, a 50% illumination width becomes 0 mm, and a 20% illumination width becomes approximately 11 mm. A 20% illumination width becomes 12 mm.

As described above, the illumination width is used for a function of the illumination ratio with respect to the highest illumination. Thus, when η (0<η<1) denotes the illumination ratio, W0(η) denotes the illumination width in the cross section in the sub-scanning direction, Wθp(η) denotes the illumination width at the non-focal point angle θp, at an arbitrary η, the following is satisfied:

$$W0(\eta) > W\theta p(\eta).$$

Tenth Embodiment

In a tenth embodiment, in the specification of the ninth embodiment, only the surface R2 (=−4.3) of the cylindrical lens is changed, so as to improve a convergent ability.

$R2 = -3.4$ mm

As a result of this change, D(BF)=2.1 mm is obtained.

By this change, a light flux on a cross section in the sub-scanning direction is a divergent bundle of rays, but the light flux slightly becomes parallel. In this configuration, the non-focal point angle θp is 37° (θp=37°), and a location in the main scanning direction where the light flux becomes parallel is 12.9 mm from the center.

Figure 40:
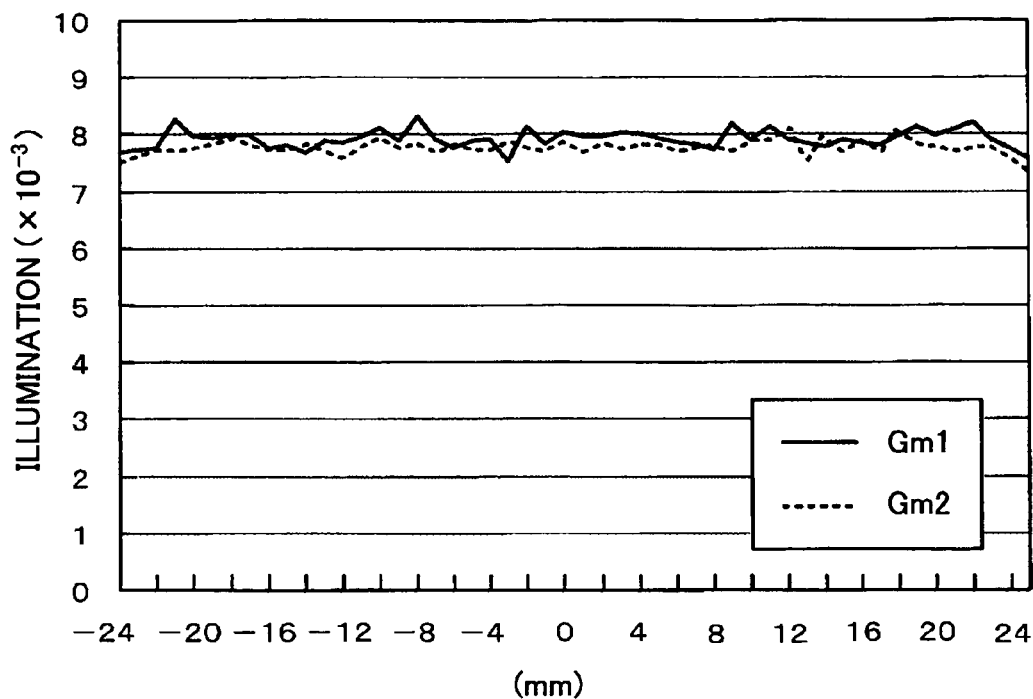
FIG. 40 is a diagram for explaining a result of a tenth embodiment of the present invention.
Figure 41:
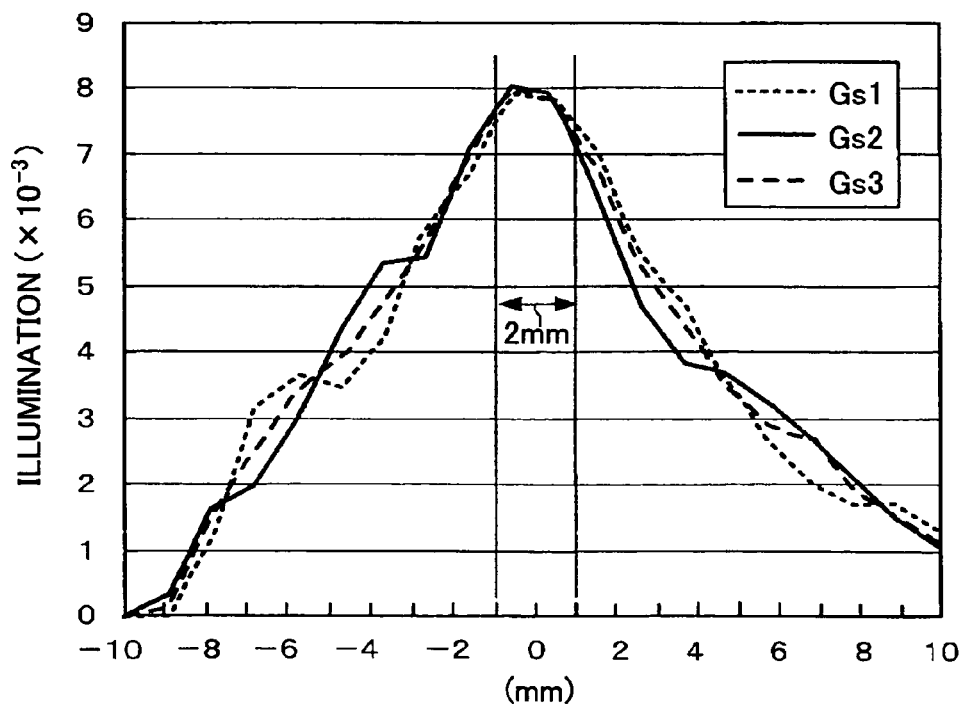
FIG. 41 is a diagram for explaining the result of the tenth embodiment of the present invention.
Figure 42:
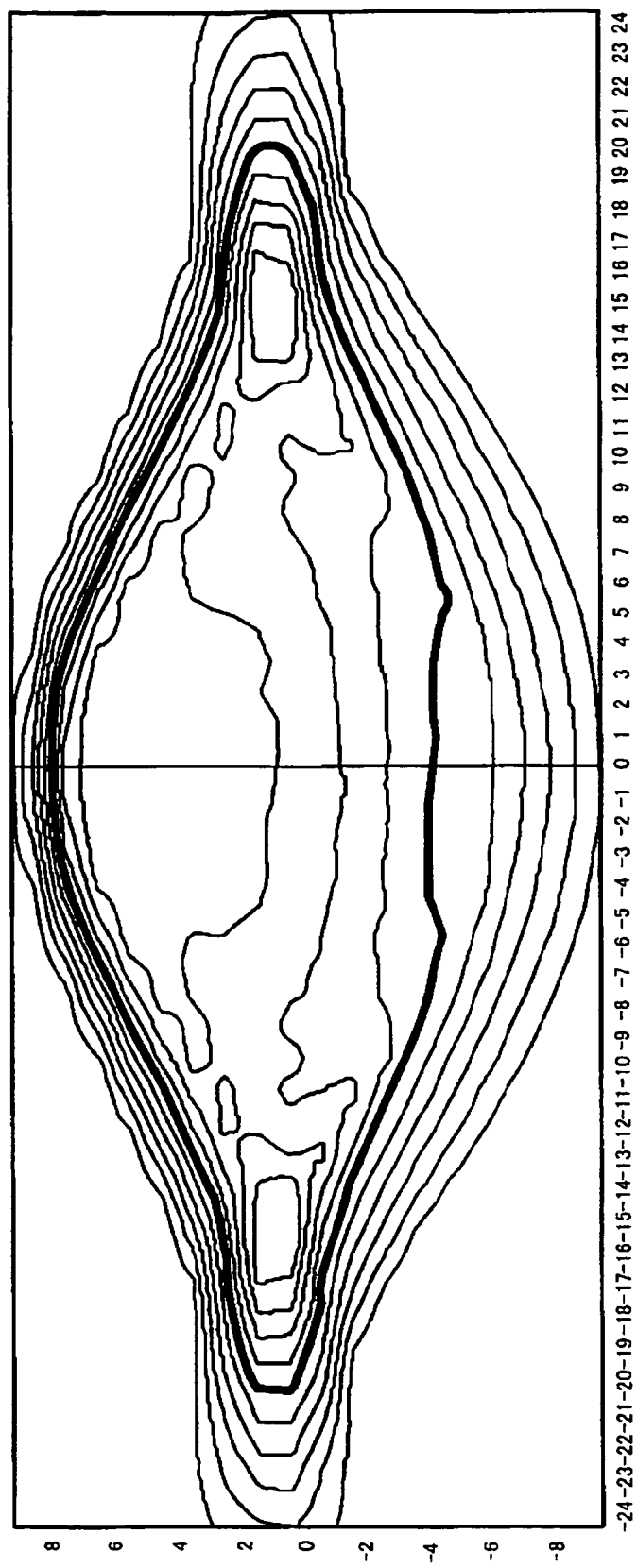
FIG. 42 is a diagram for explaining the result of the tenth embodiment of the present invention.

FIG. 40, FIG. 41, and FIG. 42 are diagrams for explaining a result of the tenth embodiment. The diagrams in FIG. 40, FIG. 41, and FIG. 42 correspond to the diagrams in FIG. 37, FIG. 38, and FIG. 39, respectively.

Eleventh Embodiment

Figure 43:
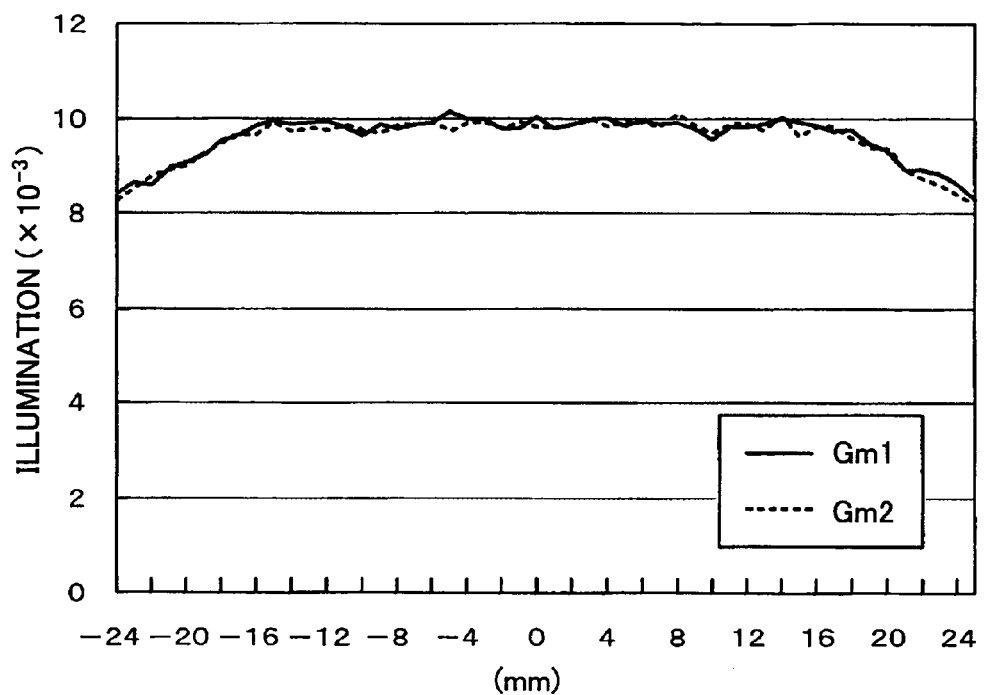
FIG. 43 is a diagram for explaining a result of an eleventh embodiment of the present invention.
Figure 44:
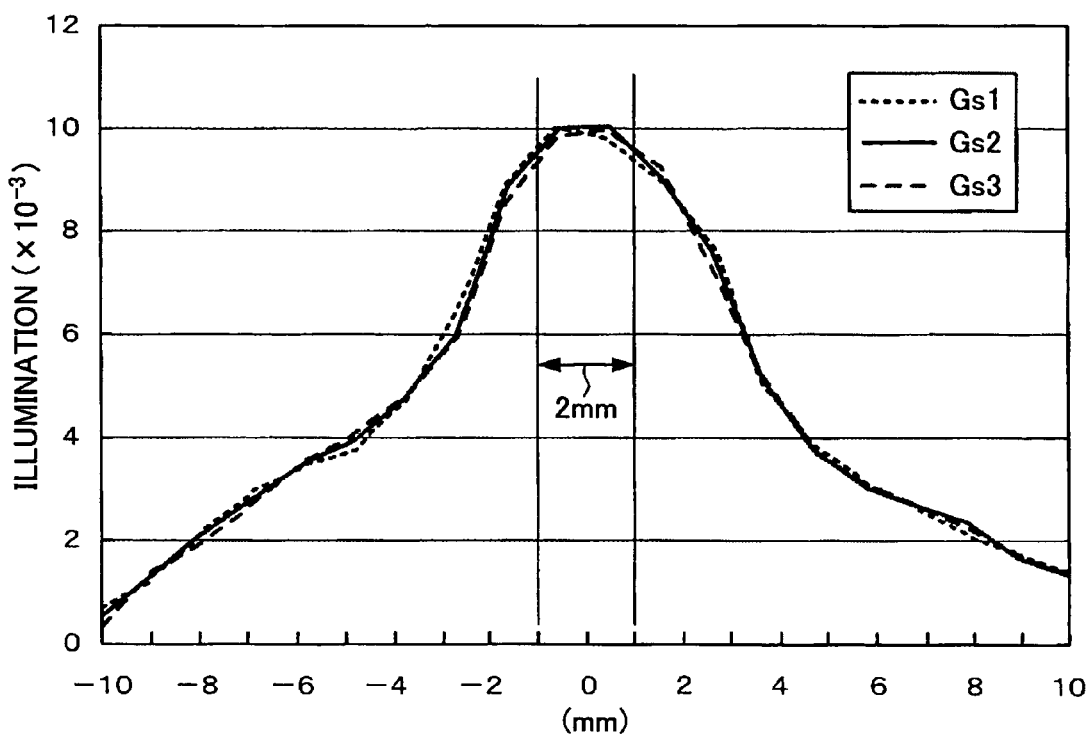
FIG. 44 is a diagram for explaining the result of the eleventh embodiment of the present invention.

FIG. 43 and FIG. 44 are diagrams for explaining a result of an eleventh embodiment of the present invention. The diagrams in FIG. 43 and FIG. 44 correspond to the diagrams in FIG. 37 and FIG. 38, respectively.

In the eleventh embodiment, in the specification of the ninth embodiment, a curvature of the surface of the cylindrical lens and a distance to the contact glass are changed.

cylindrical lens
  R1=10
  R2=−2.887 (circular cone multiplier K=−0.837 on an elliptic surface)
  distance between surface R2 of cylindrical lens and contact glass: 20 (mm)

By the above changes, the convergent angle θf becomes 35 mm (θf=35 mm), and a location of the convergent point in the main scanning direction becomes 19 mm from the center.

As shown in FIG. 43, in the eleventh embodiment, the illumination is apparently deteriorated at locations over ±17 mm at both edges in the main scanning direction. Accordingly, in order to enlarge a valid illumination area, it is required to further increase a quantity of light sources around a peripheral side, or to improve an arrangement density of the light sources more at the peripheral side.

At area of ±17 mm, as shown in FIG. 44, when a 2 mm read area is acquired, the non-formality of the illumination becomes 11%, and can be used as the read area.

Twelfth Embodiment

Figure 45:
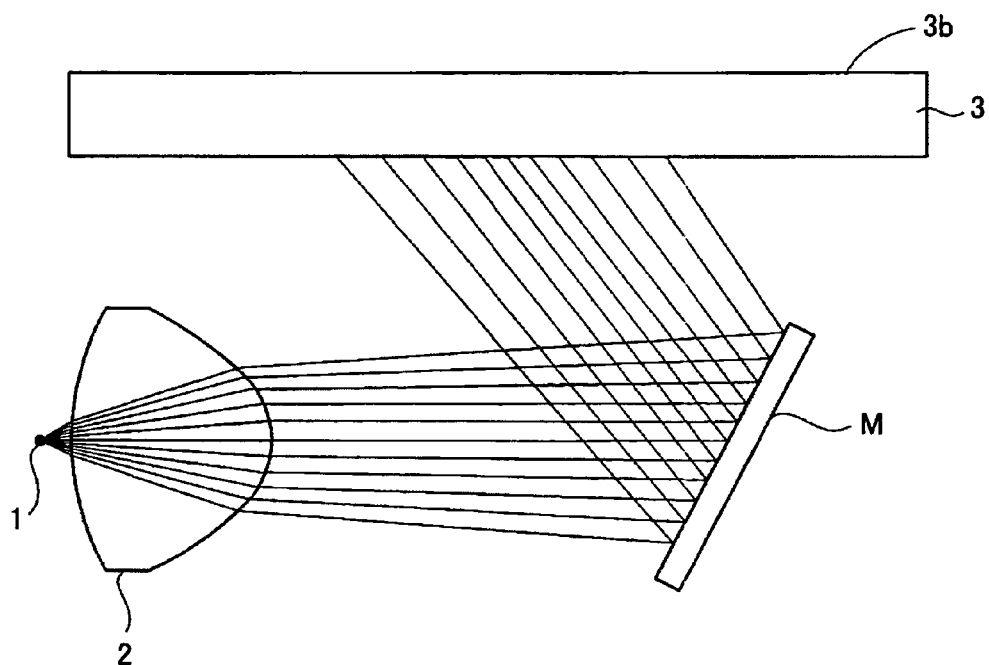
FIG. 45 is a diagram for explaining a configuration according to a twelfth embodiment of the present invention.

FIG. 45 is a diagram for explaining a configuration according to a twelfth embodiment of the present invention.

As shown in FIG. 45, in the twelfth embodiment, a reflecting mirror M is inserted between the cylindrical lens specified in the eleventh embodiment and the surface of the original, so as to minimize a module.

A specification related to a reflecting mirror is shown as follows:
  distance between cylindrical lens and reflecting mirror: 15.6 mm
  reflecting mirror size: 100 mm (main scanning direction)× 10 mm (sub-scanning direction)
  reflecting mirror inclination: 26.56 degrees contact glass location:
  surface 3a is parallel to an optical axis of the cylindrical lens and arranged at a location of 15 mm distance from optical axis.

Based on the above conditions, the followings are expressions, converted into the same expressions in the eleventh embodiment:
  distance between surface R2 of the cylindrical lens and contact glass: 34.4 (mm)
  inclinations of optical axis of cylindrical lens and contact glass: 36.86 degrees The convergent angle θf is not changed without being affected by the above changes, and the convergent point becomes farther. A distance of the convergent point from the center of the main scanning direction becomes 32.7 mm.

Figure 46:
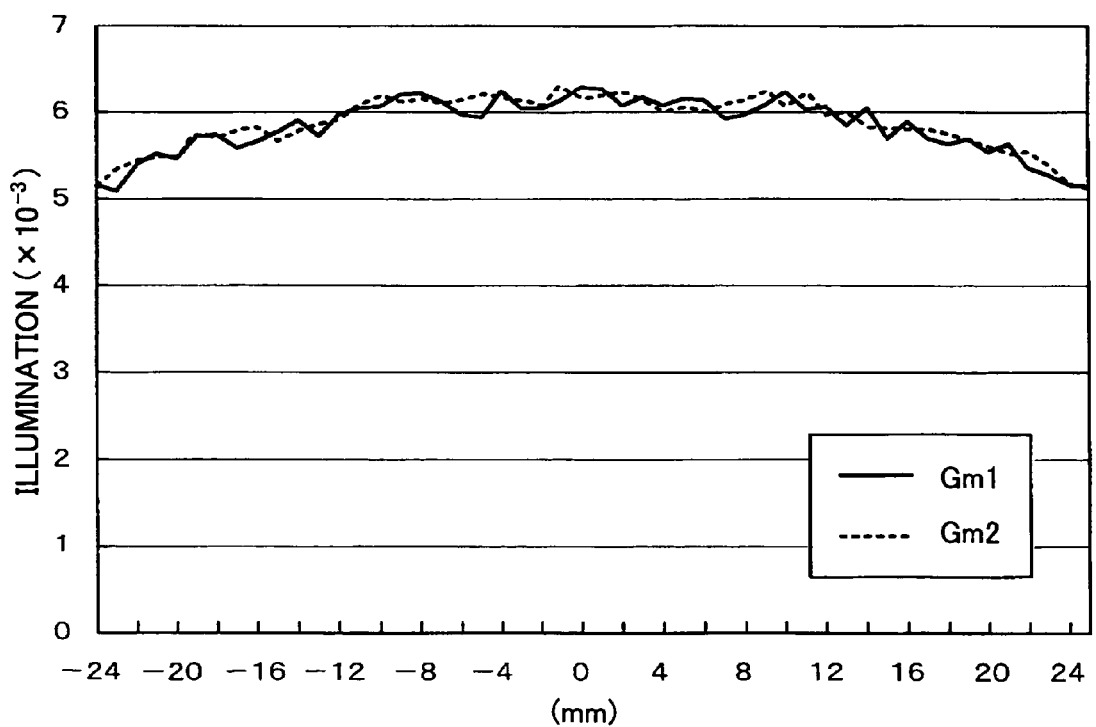
FIG. 46 is a diagram for explaining the configuration according to the twelfth embodiment of the present invention.
Figure 47:
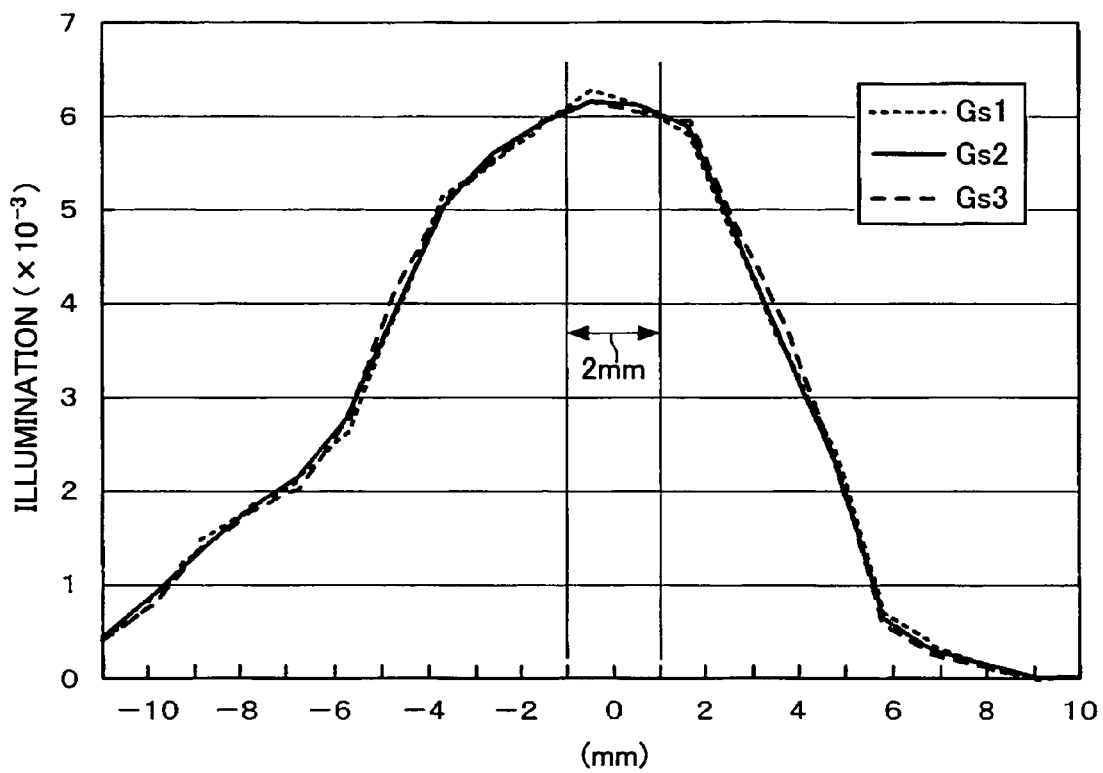
FIG. 47 is a diagram for explaining the configuration according to the twelfth embodiment of the present invention.

As shown in FIG. 46, compared with the eleventh embodiment, since cylindrical lens locates farther from the contact glass 3, it becomes significantly obvious that a peripheral light volume is lowered. Instead, the light flux in the sub-scanning direction becomes wider, a change in the sub-scanning direction becomes relatively smaller at the 2 mm width as the read area. As shown in FIG. 47, there is little difference in a range from 0 mm to 5 mm, and there is barely effect of the arrangement pitch of the light source.

Figure 48:
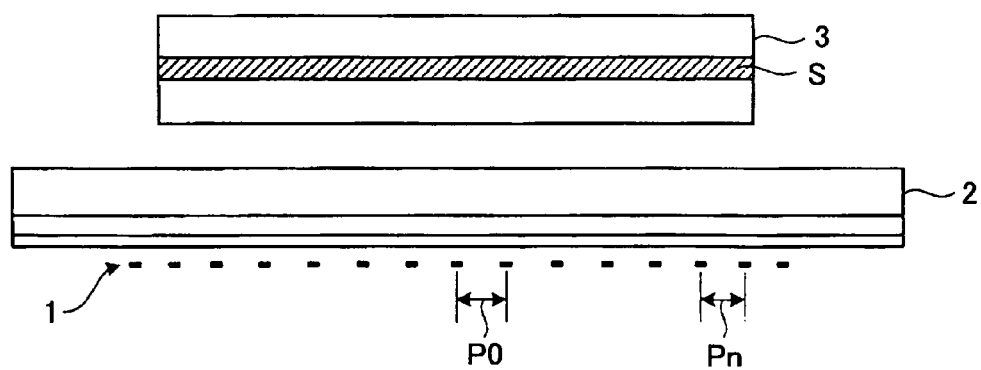
FIG. 48 is a diagram showing an example of an arrangement interval among light emitting elements of a light source unit according to the twelfth embodiment of the present invention.

FIG. 48 is a diagram showing an example of an arrangement interval among the light emitting elements of the light source unit according to the twelfth embodiment of the present invention.

In FIG. 48, the arrangement intervals P0, . . . , Pn among the light emitting elements are shown.

The arrangement interval P0 is an interval between the light emitting elements nearest the center, each arrangement interval Pn (n≧1) is an interval from an arbitrary light emitting element to an light emitting element nearest an edge of the surface to be illuminated, and the following inequalities are simultaneously satisfied:

$P(n-1) \geq Pn$, and $0.2 \leq Pn/P0 \leq 1$.

In the illumination distribution shown in FIG. 46, it can be seen that the illumination is slightly deteriorated at both edges in the main scanning direction. This appears since each edge in the main scanning direction of the surface to be illuminated receives only luminous flux from a respective center side from a location of the edge. In order to eliminate this problem, the above-described configuration is applied.

Purposes of the above-described embodiments are to uniform the illumination of the surface to be illuminated. However, the peripheral light volume becomes insufficient, which is a so-called "shading", due to a characteristic of a read optical system. The configuration in the twelfth embodiment can be used to realize a document lighting device concerning a shading correction. As described above, an arrangement density of the light emitting elements is set to be higher nearer edges of the main scanning direction, so that the peripheral light volume becomes greater than the center. As a result, a light volume through the read optical system becomes uniform.

An arrangement example to uniform the illumination distribution on the surface to be illuminated will be illustrated in detail.

A total number of the light emitting elements is 15, and the arrangement interval P0 of a light source nearest the center of the surface to be illuminated in the main scanning direction is 6.2 mm.

Toward each edge from a next light emitting element, the arrangement interval becomes narrower by 3 mm every one light emitting element until a second light emitting element, and each of other light emitting elements at an outer side of the second light emitting element consecutively becomes narrower by 0.4 mm. Accordingly, intervals between a light emitting element (seventh light emitting element) being an outer most and a light emitting element immediately inside the light emitting element (seventh light emitting element) becomes 4 mm. A distance between centers of light emitting elements located at an outer most side becomes 72.2 mm, which is longer than a length (50 mm) of the surface to be illuminated. Both edges of the main scanning direction for the surface to be illuminated receive the luminous flux from the light sources having higher arrangement density, and also receive the luminous flux from the center and from the outer side distanced from a center location. Therefore, it is possible to eliminate the deterioration of the peripheral illumination.

As described above, the length of the surface to be illuminated is 50 mm. In order to practically apply to the image reader, a quantity of the light emitting elements is increased so as to correspond to a desired width of the original.

Next, the light source applicable to the present invention will be described.

In the present invention, a light emitting diode (LED) is the most suitable light source. In order to read all originals, a white color LED is preferable to use.

There are various types for the white color LED. One of the types is a one-chip type white LED using a fluorescent material. A fluorescent part, which is called a chip, is sealed by a transparent sealing member mixing a YAG fluorescent material. This chip emits blue color configured by InGaN. Therefore, when the chip emits blue color, the fluorescent material is excited simultaneously. Since blue color and yellow color are complementary colors for each other, a combination of the both colors is recognized as a while color light when the both colors are emitted with together.

There is a white color light emitting diode as another type, in which instead of using the fluorescent material, while color is emitted by emitting a mixed color using more than two chips being of different colors. A plurality of chips are arranged on the same surface, and white color is recognized when all emitted colors are mixed.

For example, in a case of using two chips, as described above, one chip emitting blue color and another chip emitting yellow color are used. In a case of three chips, chips emitting read, green, and blue colors corresponding to the three primary colors are used.

According to the present invention, in the document lighting device including a linear area to be illuminated, it is possible to reduce the non-uniformity of the illumination in the main scanning direction, and to realize a higher quality of reading a document and an image.

The document lighting device according to the present invention can be used an image reader, a color document reader, an image forming device, and a like.

The present invention is not limited to the specifically disclosed embodiments, and variations and modifications may be made without departing from the scope of the present invention.

The present application is based on the Japanese Priority Applications No. 2004-052253 filed on Feb. 26, 2004, No. 2004-125294 filed on Apr. 21, 2004, and No. 2004-182859 filed on Jun. 21, 2004, the entire contents of which are hereby incorporated by reference.

What is claimed is:

1. A document lighting device, comprising:
   a surface to be illuminated, the surface having a length and a width and including a valid reading area;
   a light source unit arraying a plurality of light emitting elements in a main scanning direction where a direction along the length is defined as the main scanning direction and a direction along the width is defined as a sub-scanning direction; and
   a long-sized lens that is arranged between the surface to be illuminated and the light source unit, wherein a longitudinal direction of the long-sized lens is corresponded to the main scanning direction,
   wherein the document lighting device illuminates light flux from the light source unit onto the surface to be illuminated through the long-sized lens,
   wherein when in surfaces through which the light flux passes in a cross section of the sub-scanning direction of the long-sized lens, a surface R1 denotes a surface facing the light source unit, a distance D(LED) denotes between a location on the cross section at an edge of the light emitting element of the light source unit and the surface R1, and a distance D(BF) denotes a distance from a focal point location at a side of the surface R1 to the surface R1, a following expression is satisfied:

$D(LED) < D(BF)$, so that a convergent point in the main scanning direction is out of the valid reading area.

2. The document lighting device as claimed in claim 1, wherein each outgoing light of the plurality of light emitting elements is a divergent bundle of rays in the cross section of the sub-scanning direction, and becomes parallel light in a direction having a predetermined non-focal point angle θp with respect to the cross section in the sub-scanning direction.

3. The document lighting device as claimed in claim 2, wherein when η(0<η<1) denotes an illumination ratio, W0(η) denotes an illumination width in the cross section in the sub-scanning direction, Wθp(η) denotes the illumination width at the non-focal point angle θp, at an arbitrary η, a following expression is satisfied:

$W0(\eta) > W\theta p(\eta)$.

4. The document lighting device as claimed in claim 2, wherein the non-focal point angle θp is defined to be within a half-value angle of a flux distribution of the light emitting element.

5. The document lighting device as claimed in claim 1, wherein a length from one edge to another edge of the plurality of lighting emitting elements being arrayed is longer than a length of the surface to be illuminated.

6. The document lighting device as claimed in claim 1, wherein in arranging intervals among the plurality of lighting emitting elements, an arrangement interval P0 is an interval between the light emitting elements nearest a center, each arrangement interval Pn (n≧1) is an interval from an arbitrary light emitting element to an light emitting element nearest an edge of the surface to be illuminated, and a following expressions are simultaneously satisfied:

$P(n-1) \geqq Pn$ and $0.2 \leqq Pn/P01$.

7. The document lighting device as claimed in claim 1, wherein each of the plurality of light emitting elements is a while color light emitting diode of one chip type using a fluorescent material.

8. The document lighting device as claimed in claim 1, wherein each of the plurality of light emitting elements is a white color light emitting diode emitting white color by a mixed color by using more than two chips emitting different colors.

9. The document lighting device as claimed in claim 1, wherein the long-sized lens is a cylindrical lens.

10. The document lighting device as claimed in claim 1, wherein The document lighting device as claimed in claim 1, wherein the long-sized lens is a lens having different curvatures in a main scanning cross section and the sub-scanning cross section.

11. An image reader using a document lighting device, wherein the document lighting device comprises:
    a surface to be illuminated, the surface having a length and a width and including a valid reading area;
    a light source unit arraying a plurality of light emitting elements in a main scanning direction where a direction along the length is defined as the main scanning direction and a direction along the width is defined as a sub-scanning direction; and
    a long-sized lens that is arranged between the surface to be illuminated and the light source unit, wherein a longitudinal direction of the long-sized lens is corresponded to the main scanning direction,
    wherein the document lighting device illuminates light flux from the light source unit onto the surface to be illuminated through the long-sized lens,
    wherein when in surfaces through which the light flux passes in a cross section of the sub-scanning direction of the long-sized lens, a surface R1 denotes a surface facing the light source unit, a distance D(LED) denotes between a location on the cross section at an edge of the light emitting element of the light source unit and the surface R1, and a distance D(BF) denotes a distance from a focal point location at a side of the surface R1 to the surface R1, a following expression is satisfied:

$D(LED) < D(BF)$, so that a convergent point in the main scanning direction is out of the valid reading area.

* * * * *